United States Patent [19]

Clarke

[11] Patent Number: 5,448,979
[45] Date of Patent: Sep. 12, 1995

[54] DUAL COMPRESSION AND DUAL EXPANSION INTERNAL COMBUSTION ENGINE AND METHOD THEREFOR

[75] Inventor: John M. Clarke, Chillicothe, Ill.

[73] Assignee: Caterpillar Inc., Peoria, Ill.

[21] Appl. No.: 361,280

[22] Filed: Dec. 21, 1994

Related U.S. Application Data

[62] Division of Ser. No. 119,106, Apr. 1, 1991.

[51] Int. Cl.$^6$ ............................................. F02M 39/00
[52] U.S. Cl. ................................. 123/507; 123/509; 123/51 R
[58] Field of Search ............... 123/51 R, 507, 508, 123/509, 48 R, 48 A, 48 AA, 294; 417/380, 381

[56] References Cited

U.S. PATENT DOCUMENTS

| | | | |
|---|---|---|---|
| 2,758,582 | 8/1956 | Humphreys | 123/48 AA |
| 2,846,987 | 8/1958 | Nettel | 123/507 |
| 4,048,971 | 9/1977 | Pritchett | 123/507 |
| 4,539,946 | 9/1985 | Hedelin | 123/48 A |

*Primary Examiner*—Marguerite Macy
*Attorney, Agent, or Firm*—Kenneth A. Rhoads

[57] ABSTRACT

An apparatus and method is provided for a dual compression and dual expansion internal combustion engine (8) that is compact, efficient, and has low combustion noise and emissions. The subject engine (8) includes a low pressure piston assembly (56) reciprocally disposed in an operating chamber (22) defined in a housing (10). A pair of opposed high pressure piston assemblies (58) and (60) are directly mounted on a pair of geared together, counter rotating, crankshafts (52) and (54) and reciprocally disposed in bores (178) and (186) of the low pressure piston assembly (56). The disposition of the second and third piston assemblies (58) and (60) within their respective bores (178) and (186) defines a combustion chamber (254). An intake chamber (144) for compression of inducted air and an exhaust chamber (146) for expansion of exhaust gas are defined in the operating chamber (22) between the low pressure piston assembly (56) and the housing (10). Air moves from the intake chamber (144) to the exhaust chamber (146), but in the process the air is compressed, mixed with fuel, and combusted. The resulting gas is expanded in the combustion space (254) between the high pressure piston assemblies (56) and (60). A complete cycle takes approximately 900 degrees of rotation of the crankshafts (52) and (54) during which the intake chamber (254), the combustion chamber (254), and the exhaust chamber (146) each undergoes five "strokes". Thus, the disclosed engine (8) is compact, efficient, and has less combustion noise, and low emissions.

19 Claims, 11 Drawing Sheets

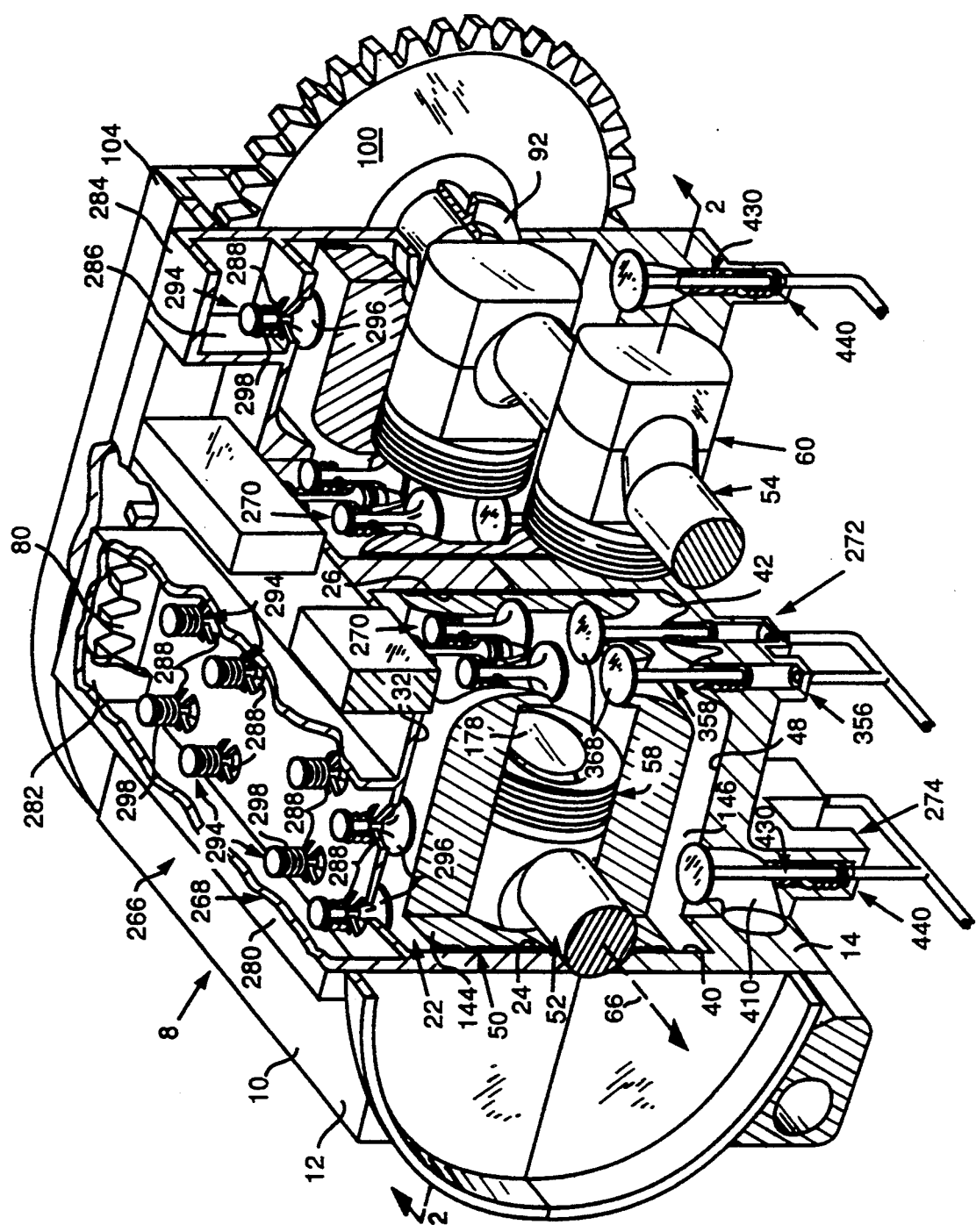

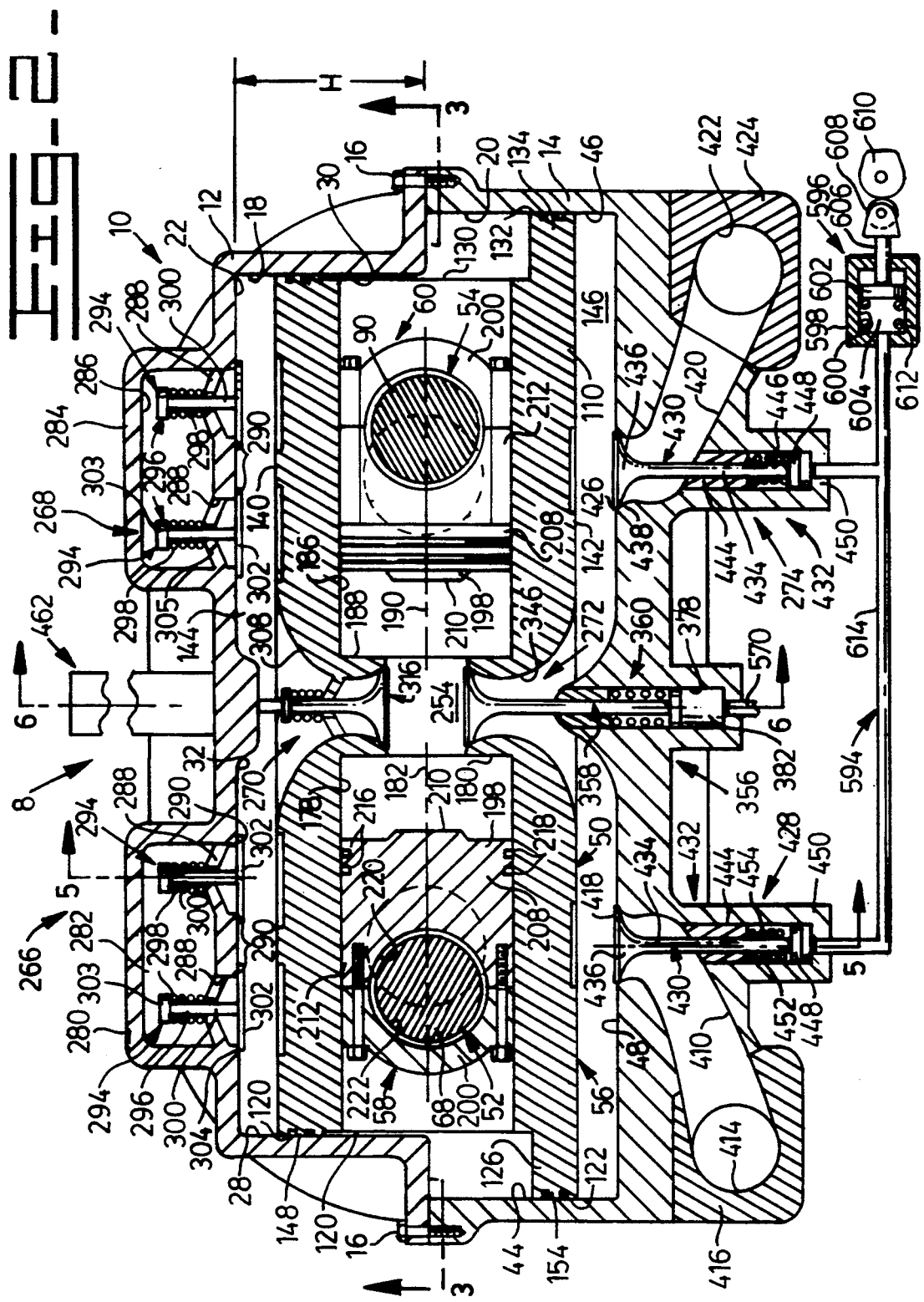

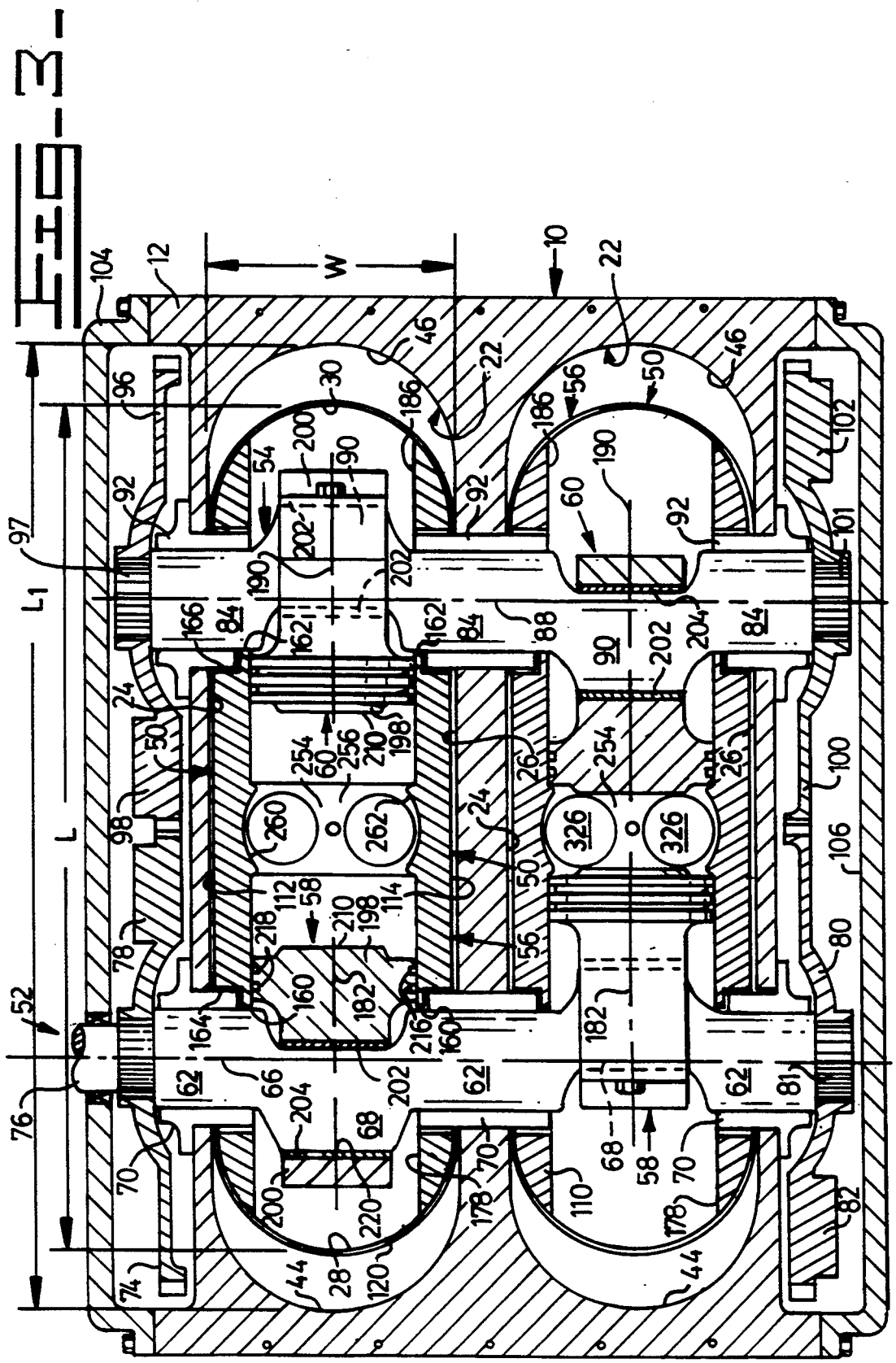

Fig_5_

Fig_6_

Fig_8_

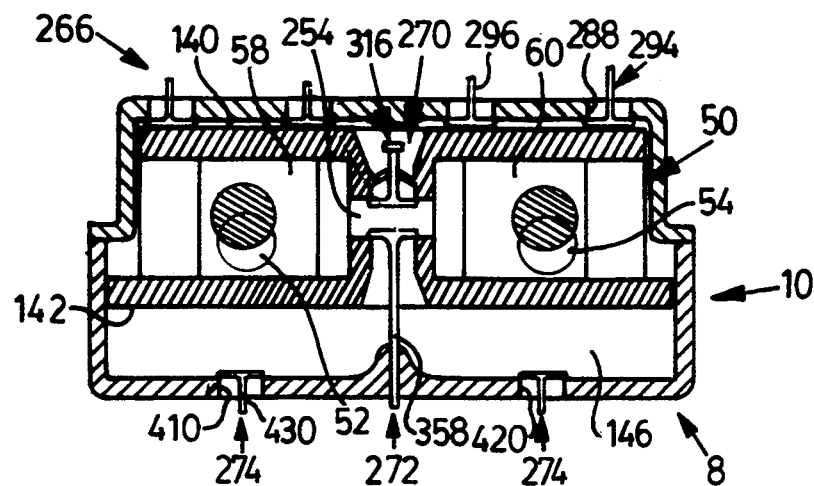
Fig_10a_
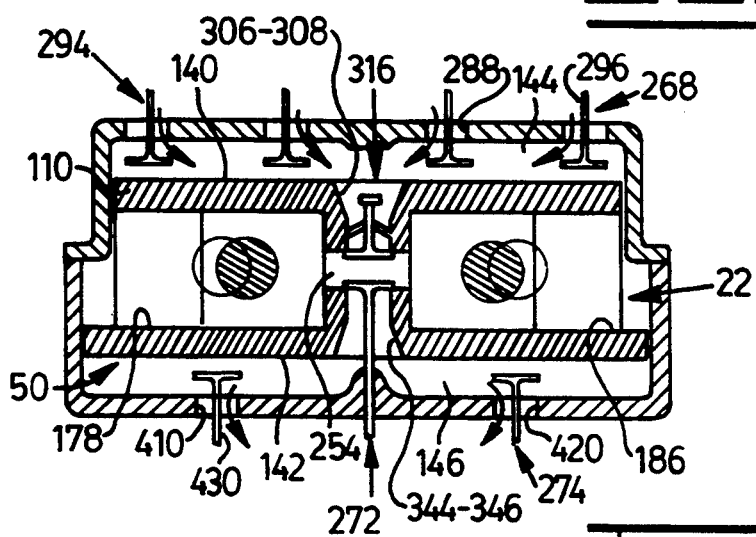
Fig_10b_
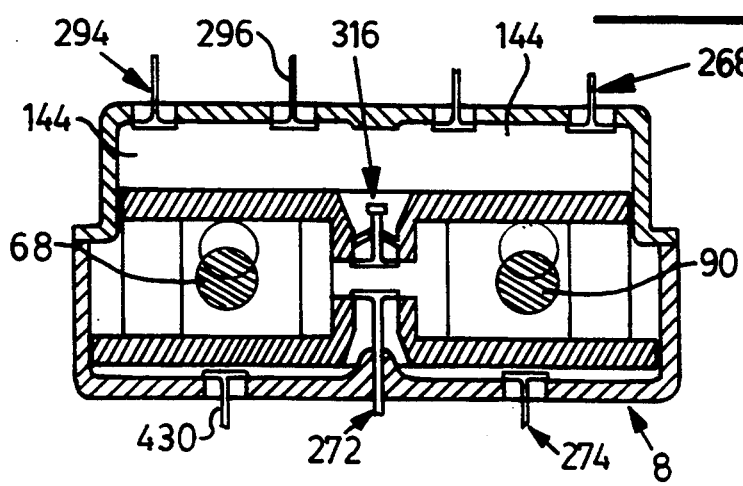
Fig_10c_

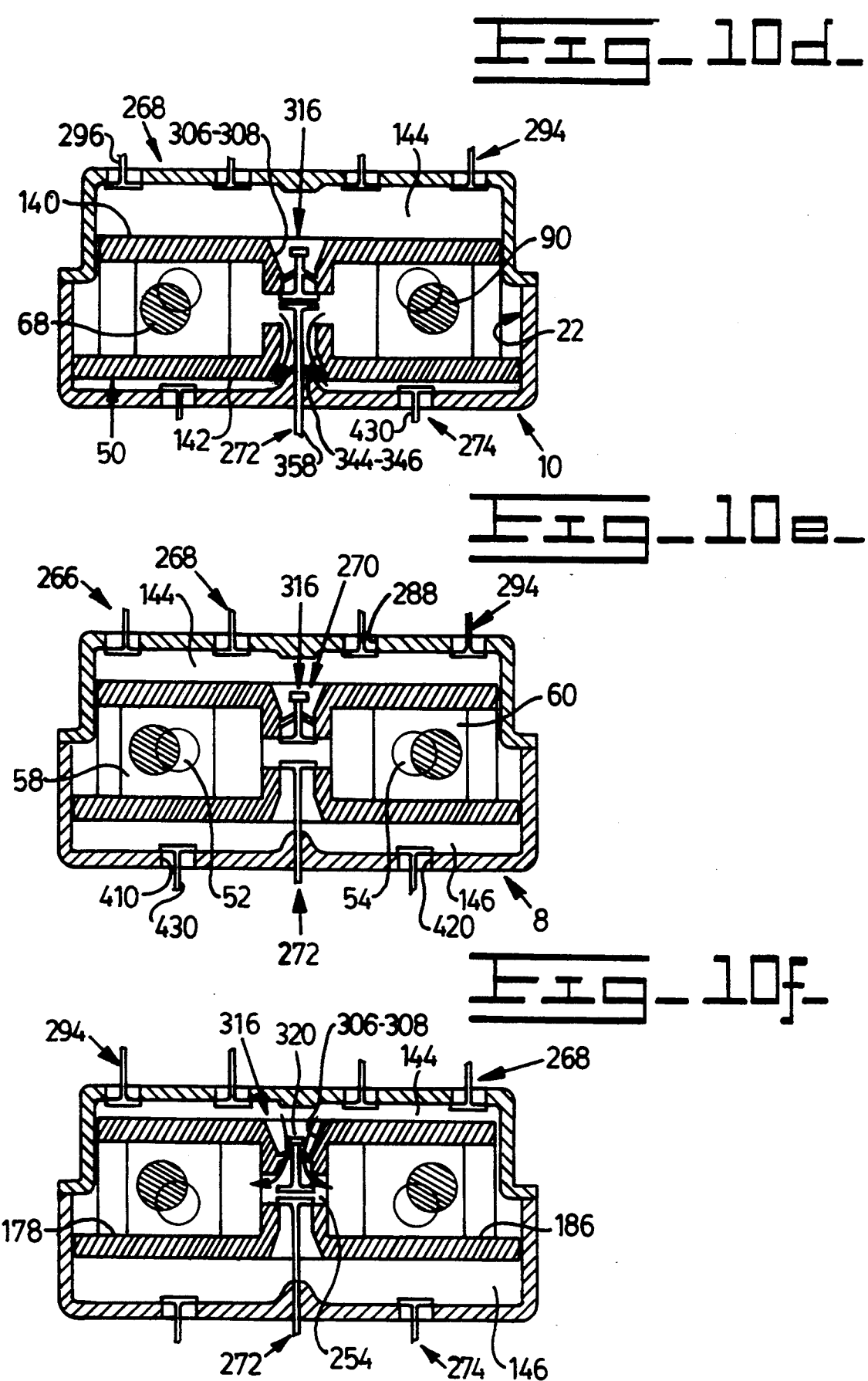

DUAL COMPRESSION AND DUAL EXPANSION INTERNAL COMBUSTION ENGINE AND METHOD THEREFOR

This is a divisional application of application Ser. No. 08/119,106, filed Apr. 1, 1991.

TECHNICAL FIELD

This invention relates, generally to a compact internal combustion engine having dual compression and dual expansion and more particularly to an engine having multi-piston subassemblies preferably in back-to-back dynamically balanced units.

BACKGROUND ART

An internal combustion engine generally includes one or more reciprocating pistons operably connected to a crankshaft by a connecting rod to deliver energy therefrom. Such engines can operate on a 4-stroke cycle with sequentially timed phases of intake, compression, power, and exhaust, as well as 2-stroke-cycle. In a spark ignited engine a mixture of fuel and air is compressed by the piston within the closed confines of the cylinder. Near the end of the compression phase ignition occurs either by compression heating or by an ignition device to form hot burning gas which expands and drives the piston to create power.

In a diesel engine air is similarly compressed during the compression phase. Near the end of the compression phase, fuel is injected into the cylinder where it will mix with the compressed air and spontaneously ignite to form hot burning gas which, during the expansion phase of the cycle, expands against the movable piston and thereby creates power.

The last several years has seen an increasing emphasis on designing for improved fuel economy and efficiency, reduced emissions, a greater service life, and an increased power output per unit engine size.

The power of engines having similar combustion systems can be compared on the basis of their relative air flows. Conventionally there are two approaches to obtaining high air flow rates through a given engine volume. The first is the application of turbochargers to raise the density of the air entering the cylinders. The second is typified by the Wankel rotary piston engine in which a major geometric change achieves large "cylinders" in a small engine volume. The highest power density levels are achieved by combining these methods. The rotary piston engine is unsuited geometrically to withstand high cylinder pressures and to use high compression ratios so the fuel economy is poor and the potential for using turbochargers to boost the inlet air to high density is limited to levels below conventional engines.

Conventionally reciprocating engines use large bore/stroke ratio when optimized for power and a smaller bore/stroke ratio when optimized for economy. This stems from the importance of providing enough valve area for good breathing for power and a compact combustion chamber with high compression for economy. By using two stage compression and expansion processes it is possible to achieve induction in a large bore/stroke cylinder and combustion in a more compact space and so to achieve a better combination of high power and high efficiency.

It is well known that dilution of charge by recirculating exhaust gas can have a beneficial influence on flame temperature and the level of $NO_x$ emissions from an engine. Conventionally the exhaust gas subtracts from the space available for a fresh charge of air and so this method is inappropriate for high power levels.

Accordingly what is needed is an improved internal combustion engine which is (a) compact because it has large "cylinders" for induction relative to its volume, (b) efficient because it can use high compression ratios with a compact combustion space and, (c) low on $NO_x$ emissions because it achieves high levels of exhaust retention without loss of power.

DISCLOSURE OF THE INVENTION

In one aspect of the present invention, a method of burning a mixture of combustible fuel and air in an engine includes a housing defining an operating chamber, a first piston assembly defining a bore is disposed in the operating chamber and defines therewith an intake chamber and an exhaust chamber. A second piston assembly is reciprocally disposed in the bore of the first piston assembly and defines therewith a combustion space. A crankshaft is rotatably supported in the housing and the second piston assembly is operatively connected to the crankshaft. The first piston assembly is moved in a first direction in the operating chamber inducting a charge of air into the intake chamber. The first piston assembly is moved in a second direction to a preselected position compressing the air in the intake chamber. The first piston assembly is moved beyond the preselected position continuing to compress the air in the intake chamber and transferring the compressed air into the combustion space and moving the second piston assembly to a preselected position compressing the air in the combustion space. During the same interval the second piston assembly moves in the bore beyond the preselected position further compressing the air in the combustion space. Ignition of fuel and air in the combustion space drives the second piston assembly to a preselected position in the bore, transmitting energy to the crankshaft. The second piston assembly continues to be driven in the bore, transmitting energy to the crankshaft and the gas is transferred to the exhaust chamber. The first piston assembly is moved in the second direction to a preselected position, expanding the gas in the exhaust chamber and transmitting energy to the crankshaft. The first piston assembly is moved in the first direction exhausting the gas from the exhaust chamber.

In a further aspect of the invention, a method of burning a mixture of combustible fuel and air in the engine includes a housing defining an operating chamber. A first piston assembly is disposed in the operating chamber and defining therewith, an intake chamber, and an exhaust chamber. A crankshaft is rotatably supported in the housing and a second piston assembly is operatively connected to the crankshaft and reciprocally disposed in a bore defined in the first piston assembly. The first piston assembly is moved in a first direction in the operating chamber inducting a charge of air into the intake chamber and reducing the volume in the exhaust chamber, exhausting the gas from the exhaust chamber. During the same interval the second piston assembly is moved in the bore compressing air in the combustion space. Ignition of fuel and air in the combustion space drives the second piston assembly to a preselected position in the bore transmitting energy of the expanded gas to the crankshaft. The first piston assembly is moved in a second direction to a preselected position compressing the air in the intake chamber. During the same interval gas expansion drives the second piston assembly in the bore transmitting energy to the crankshaft and transferring the gas to the exhaust chamber which is expanding. The first piston assembly is moved beyond the preselected position continuing to compress the air and transferring the compressed air into the combustion space. During the same interval moving the second piston assembly in the bore to a preselected position and compressing the air in the combustion space while continuing moving the first piston assembly in the second direction expanding the gas in the exhaust chamber and transmitting energy to the crankshaft.

In a further aspect of the present invention, a method of injecting fuel into a combustion space associated with a piston assembly reciprocally disposed in an operating chamber includes mounting a fuel injector nozzle assembly on the piston assembly. Fuel is delivered to a pump body and the fuel is injected into the nozzle assembly by a control member connected for movement with the piston assembly.

In a further aspect of the present invention, an internal combustion engine includes a housing defining an operating chamber, and having an induction passage and a scavenge passage. A first piston assembly being reciprocally disposed in the operating chamber and defining therewith, an intake chamber and an exhaust chamber. A second piston assembly is reciprocally disposed in a bore defined in the first piston assembly and defining therewith a combustion space. Flow control means selectively communicate the induction passage with the intake chamber, the intake chamber with the combustion space, the combustion space with the exhaust chamber, and the exhaust chamber with the scavenge passage. Means are provided for introducing a combustible fuel into a combustion space.

In a further aspect of the present invention, an internal combustion engine includes a housing defining an operating chamber. A first piston assembly defining a first and second coaxial aligned bores is reciprocally mounted in the operating chamber. A second and third piston assembly is reciprocally disposed in the first and second bores and defining with the first piston assembly a combustion space. A first and second crankshaft is respectively connected to the second and third piston assemblies for delivering power in response to combustion in the combustion space.

In a further aspect of the present invention, a fuel introducing system for injecting fuel into a combustion space of an engine having a housing defining a combustion space and a piston assembly reciprocally disposed in an operating chamber includes a fuel injector nozzle assembly mounted on the piston assembly and the fuel injector means includes a control member connected for movement with the piston assembly for controllably delivering fuel to the nozzle assembly in response to reciprocation of the piston assembly.

In a further aspect of the present invention, a valve train mechanism for an engine having a housing defining an operating chamber, a piston assembly reciprocally disposed in the operating chamber includes the piston assembly defining a port and a sealing surface thereabout, and a valve including a sealing face. Support means reciprocally supports the valve on the housing for movement with the piston assembly. Valve actuating means controllably displaces the sealing face away from the sealing surface during a preselected range of movement of the piston assembly.

BRIEF DESCRIPTION OF THE DRAWINGS

FIG. 1 is an isometric view of a twin crankshaft version of an internal combustion engine constructed in accordance with the present invention with portions broken away to better illustrate details thereof;

FIG. 2 is a diagrammatic transverse cross-sectional view of a representative operating chamber including a multi-piston subassembly of the engine shown in FIG. 1 as taken along line 2—2 thereof;

FIG. 3 is a diagrammatic cross-sectional view of the engine shown in FIG. 2 taken along line 3—3 thereof;

FIG. 10A through 10F schematically illustrate the relative position of the multi-piston subassembly and the associated valves within each operating chamber for various crankshaft rotational positions.

BEST MODE FOR CARRYING OUT THE INVENTION

Figure 4:
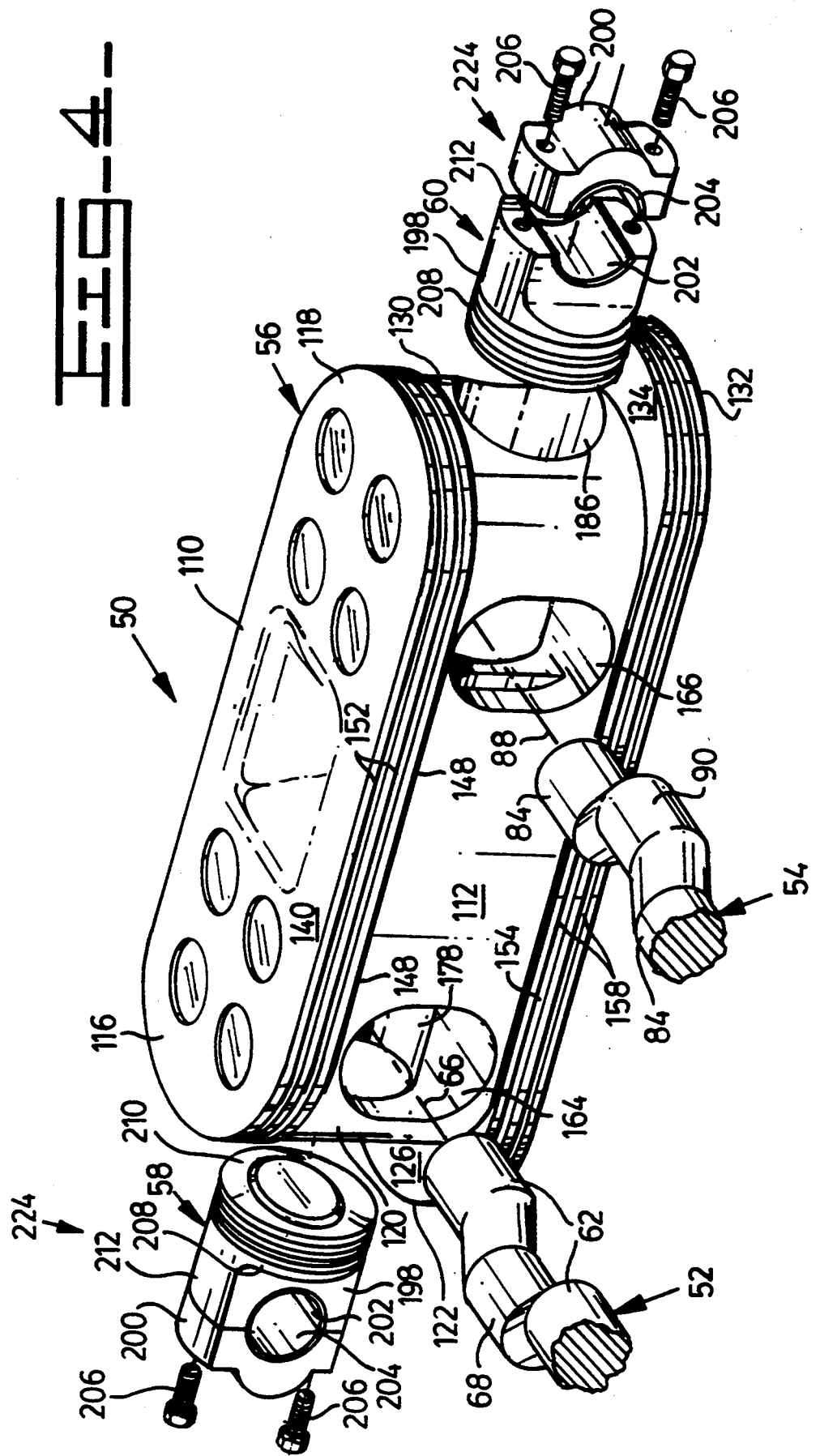
FIG. 4 is an isometric view of a representative multi-piston subassembly of the engine shown in FIG. 2.

Referring to FIGS. 1 and 2, an internal combustion engine 8 includes a housing 10 having a first or upper housing portion 12 and a second or lower housing portion 14 removably secured together by a plurality of fasteners or bolts 16. The upper housing portion 12 defines a pair of downwardly open, generally oblong first cavities 18 and the lower portion 14 defines a pair of upwardly open generally oblong second cavities 20. The first and second cavities 18 and 20 are arranged in an opposed and aligned relationship to form a pair of identical transversely oriented and longitudinally spaced operating chambers 22.

As best shown in FIGS. 1-3, and 5 each of the first cavities 18 is defined by a pair of generally parallel side surfaces 24 and 26, a pair of generally semicylindrical end surfaces 28 and 30 that blendingly connect together the side surfaces, and a ceiling surface 32. The first cavities 18 have a preselected width "W" in the longitudinal direction, a length "L" in the transverse direction, and a height "H" as indicated in the drawings.

As best illustrated in FIGS. 1-3 and 7 each of the second cavities 20 is defined by a pair of generally semicylindrical end surfaces 44 and 46 that blendingly connect together the side surfaces, and a bottom surface 48. In this embodiment the second cavities 20 have the same width "W" and the same height "H" as the first cavities 18, but the length "$L_1$" of each second cavity 20 is greater than the length "L" of each first cavity 18.

MULTI-PISTON SUBASSEMBLY

Referring to FIGS. 1–5 each of the operating chambers 22 contains a multi-piston subassembly 50 including a first left longitudinal crankshaft 52 as shown at the left when viewing FIGS. 2 and 3, a second right longitudinal crankshaft 54, a first or relatively large, low pressure piston assembly 56, and a pair of opposed smaller second and third high pressure piston assemblies 58 and 60.

As is shown in FIGS. 1–4, the first crankshaft 52, includes a plurality of longitudinally aligned spaced main bearing journals 62 having a central axis 66, and a pair of intermittent diametrically opposite cylindrical crankpins 68. The crankpins 68 are radially offset from the axis 66 of the main bearing journals 62. Each of the main bearing journals 62 of the first crankshaft 52 is rotatably supported between the upper and lower housing portions 12 and 14 of the housing 10, in a conventional manner, with a split sleeve bearing assembly 70. The longitudinally orientated central axis 66 is disposed generally at a right angle to the side surfaces 24, 26, 40, and 42 of the cavities 18 and 20.

A first rear timing and balancing gear 74 is connected to a rear power take-off end 76 of the first crankshaft 52 external of the housing 10. The first gear 74 is formed with a balance weight 78 on its side face positioned approximately 180 degrees away from the adjacent crankpin 68. A second front timing and balancing gear 80 is connected to an opposite front end 81 of the first crankshaft 52 external of the housing 10. The second gear 80 is formed with a balance weight 82 on its side face positioned approximately 180 degrees away from the adjacent crankpin 68.

As is illustrated in FIGS. 2, 3, and 4 the second crankshaft 54 includes a plurality of spaced, longitudinally aligned main bearing journals 84 having a central axis 88, and a pair of intermittent, diametrically opposite cylindrical crankpins 90. The crank pins 90 are axially offset with respect to the main bearing journals 84 in a conventional manner. Each of the bearing journals 84 of the second crankshaft 54 is rotatably supported between the first and second housing portions 12 and 14 of the housing 10, in a conventional manner, with a split sleeve bearing assembly 92. The axes 66 and 88 of the first and second crankshafts 52 and 54 are generally parallel.

A third rear timing and balancing gear 96 is connected to a rear end 97 of the second crankshaft 54 external of the housing 10 and in mesh with the first rear timing gear 74. The gear 96 is formed with a balance weight 98 on its side face positioned approximately 180 degrees away from the adjacent crankpin 90. A fourth front timing and balancing gear 100 is connected to an opposite front end 101 of the second crankshaft 54 external of the housing 10 and in mesh with the second front timing gear 80. The fourth gear 100 is formed with a balance weight 102 on its side face positioned approximately 180 degrees away from the adjacent crankpin 90. The rear first and third gears 74 and 96 mesh with one another and the front second and fourth gears 80 and 100 mesh with one another to impart phased counter rotation of the first and second crankshafts 52 and 54. The balance weights 78, 82, 98, and 102 together with the counter rotation of the first and second crankshafts 52 and 54 achieves complete balance with respect to forces and couples in the longitudinal, transverse, and perpendicular directions. A rear cover 104 is removably secured to the rear of the housing 10 to enclose the first and third gears 74 and 96 and a front cover 106 is removably secured to the front of the housing to enclose the second and fourth gears 80 and 100.

As best shown in FIGS. 2, 3, and 4, the first piston assembly 56 is of generally oblong shape and is reciprocally and sealably disposed in the operating chamber 22 of the housing 10. The first piston assembly 56 includes a body 110 having a pair of generally parallel side surfaces 112 and 114, a first or left end portion 116, and a second or right end portion 118. The left end portion 116 includes a first semicylindrical end surface 120 and a second, semicylindrical end surface 122. The second semicylindrical end surface 122 extends outwardly beyond the first semicylindrical end surface 120 to form a generally horizontal flange portion 126. The right end portion 118 also includes a first semicylindrical end surface 130 and a second semicylindrical end surface 132 with the second semicylindrical end surface 132 extending outwardly beyond the first semicylindrical end surface 130 to form a generally horizontal flange portion 134.

The body 110 of the first piston assembly 56 further includes a top working surface 140 and a bottom working surface 142. The working surfaces 140 and 142 are preferably parallel to each other and perpendicular to the side surfaces 112 and 114. The disposition of the top working surface 140 within the first cavity 18 defines an intake chamber 144 of variable volume. The disposition of the bottom working surface 142 within the second cavity 20 defines an exhaust chamber 146 of variable volume. In this specific instance the area of the bottom working surface 142 is greater than the area of the top working surface 140. The first piston assembly 56 is reciprocally moveable in the operating chamber 22 in a downward first direction, when viewing FIG. 2, increasing the volume of the intake chamber 144 and reducing the volume of the exhaust chamber 146 and in an upward second direction decreasing the volume in the intake chamber and increasing the volume in the exhaust chamber.

Figure 8:
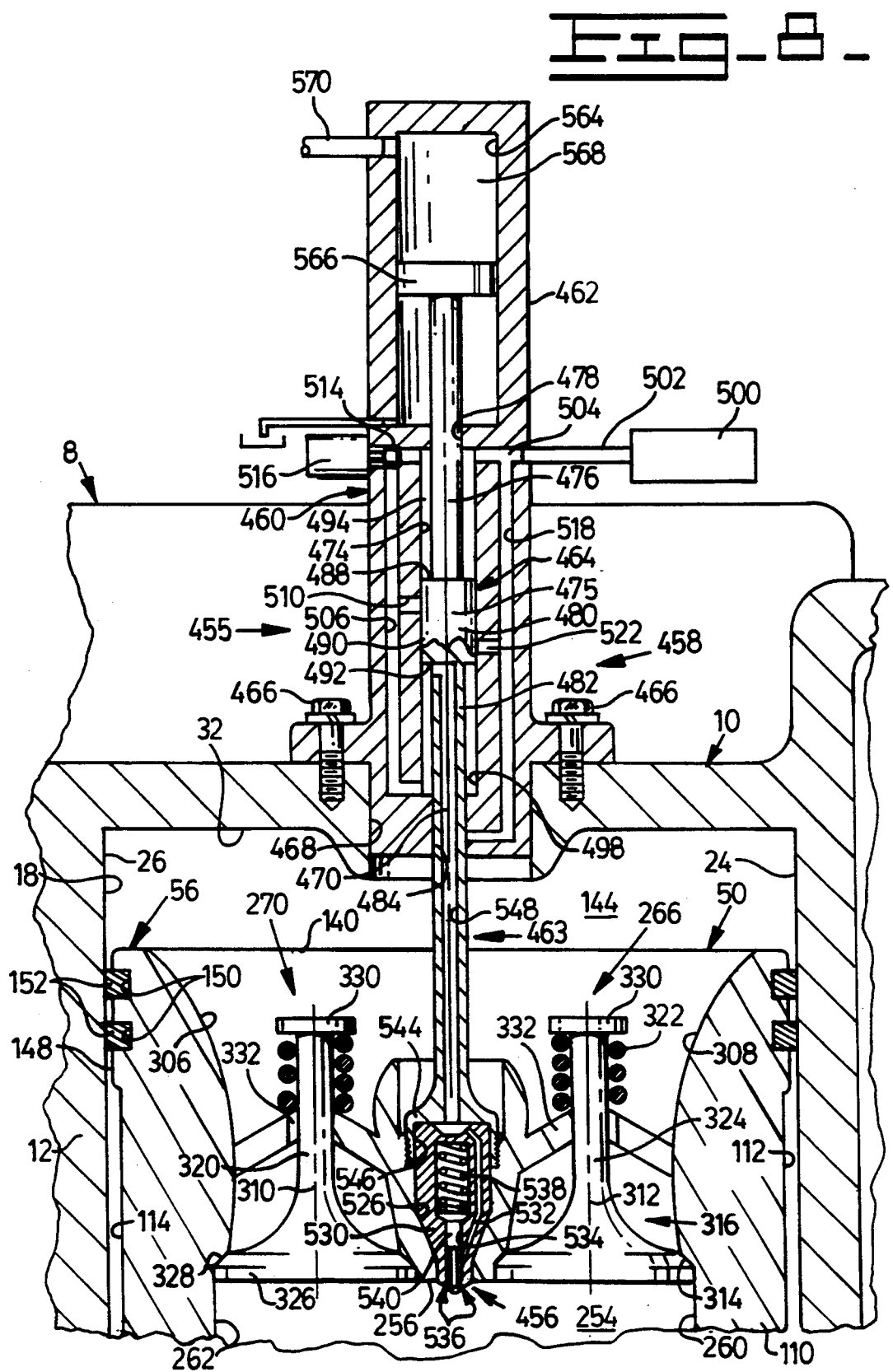
FIG. 8 is a further enlarged diagrammatic transverse cross-section view of the upper portion of FIG. 7.

As best shown in FIGS. 2, 4, and 8 a band 148 extends fully around the periphery of the side surfaces 112 and 114 and the semicylindrical end surfaces 120 and 130 of the body 110 adjacent the top working surface 140. The band 148 defines a pair of ring grooves 150 that extend fully around the periphery thereof. A pair of sealing rings 152 are received in the ring grooves 150 and sealingly engage with the surfaces 24, 26, 28, and 30 of the first cavity 18.

Figure 7:
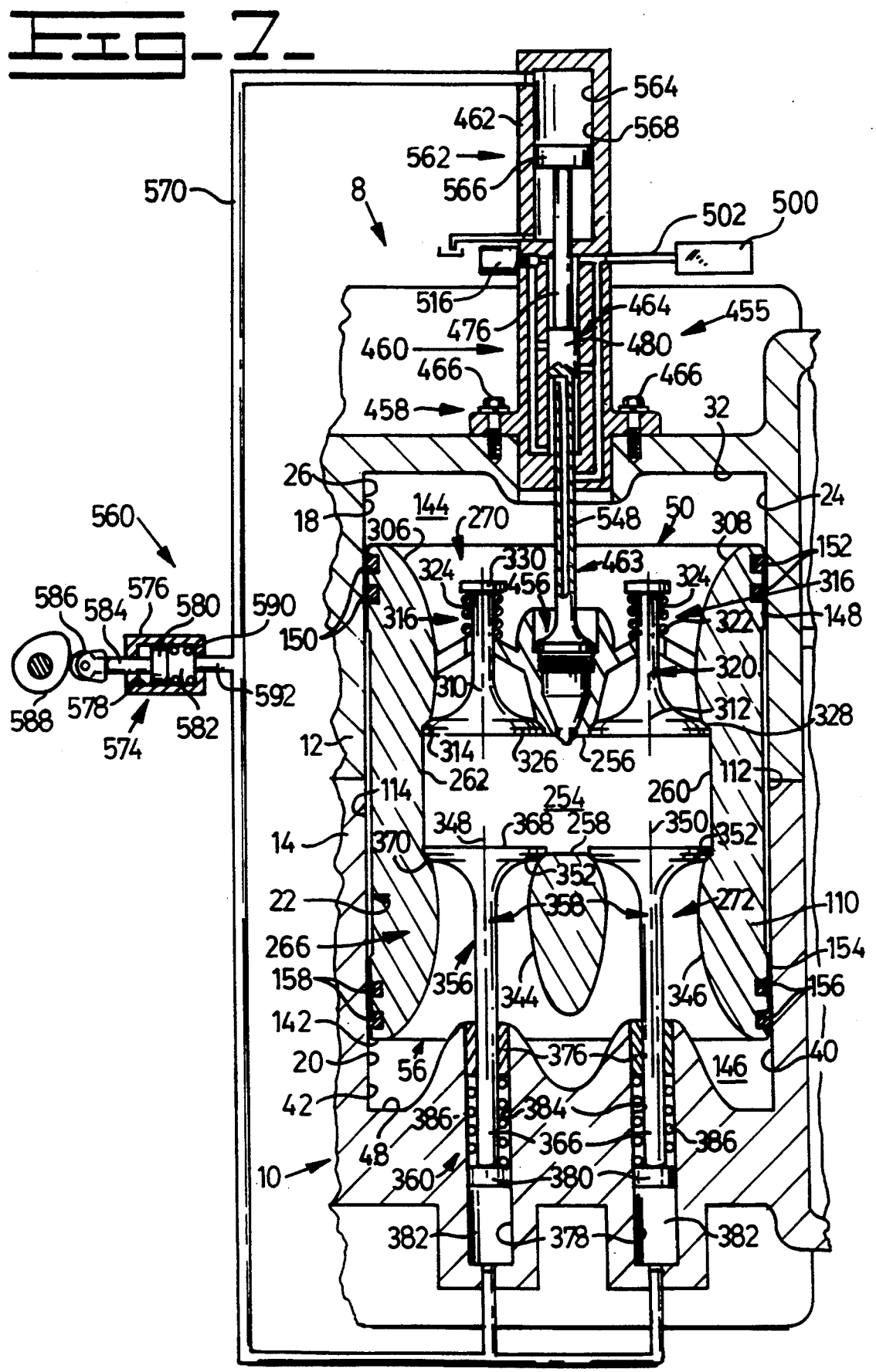
FIG. 7 is a fragmentary enlarged diagrammatic transverse cross-section view of a representative operating chamber and multi-piston subassembly, and associated intake and exhaust valve and fuel injector system of the engine.

As best shown in FIGS. 2, 4, and 7 a band 154 extends fully around the periphery of the side surfaces 112 and the semicircular side surfaces 122 and 132 of the body 110 adjacent the bottom working surface 142. The band 154 defines a pair of ring grooves 156 that extend fully around the periphery thereof. A pair of sealing rings 158 are disposed in the ring grooves 156 and sealingly engage with the surfaces 40, 42, 44, and 46 of the second cavity 20.

Figure 5:
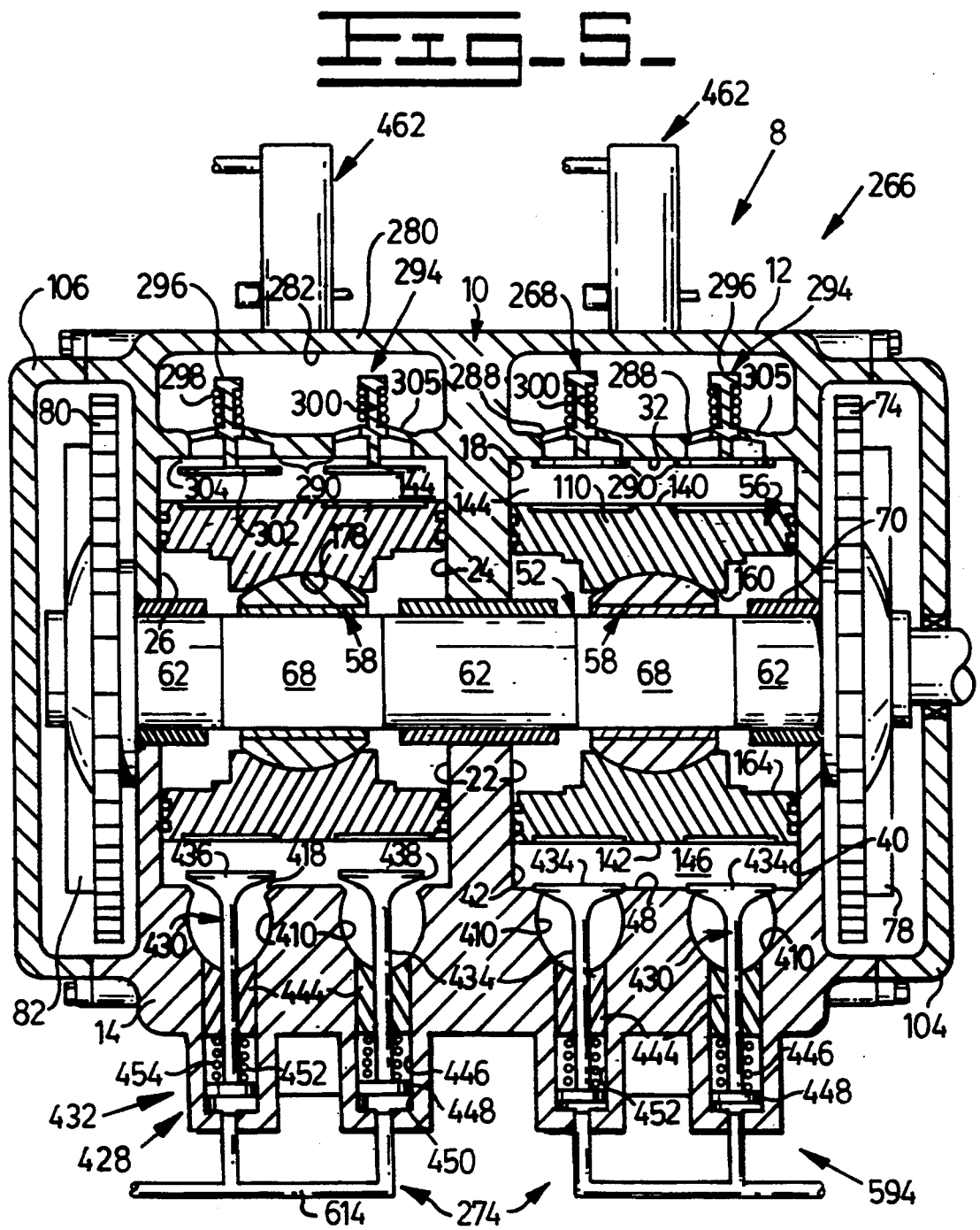
FIG. 5 is a diagrammatic transverse cross-sectional view of the engine constructed in accordance with the present invention taken in the direction of arrows 5-5 in FIG. 2.

Referring now to FIGS. 3, 4, and 5, a pair of first and second profiled crankshaft clearance passages 160 and 162 are defined in the body 110 of the first piston assembly 56 adjacent the left end portion 116 and the right end portion 118 respectively. The first passage 160 is arranged generally perpendicular to the side surfaces 112 and 114 and coaxial aligned with the main bearing journals 62 of the first crankshaft 52. The second passage 162 is arranged generally perpendicular to the side surfaces 112 and 114 and coaxially aligned with the main bearing journals 84 of the second crankshaft 54.

Each of the first and second passages 160 and 162 is spaced approximately midway between the top and bottom working surfaces 140 and 142 and parallel thereto. Defined in the side surfaces 112 and 114 of the piston body 110 about each of the passages 160 and 162 are a pair of vertically orientated, oblong stepped clearance recesses 164 and 166. The first crankshaft 52 is operatively disposed in the passage 160 and the recesses 164 and 166 without making contact therewith. The second crankshaft 54 is operatively disposed in the passage 162 and the recesses 64 and 166 without making contact therewith.

AS is shown best in FIGS. 2 and 3, a first cylindrical piston bore 178 having an end surface 180 and a central axis 182 is defined in the body 110 of the first piston assembly 56. The first piston bore 178 extends inward from the semicylindrical end surface 120 of the first end portion 116. The central axis 182 is preferably located on a first plane that is parallel to and midway between the side surfaces 112 and 114, and on a second plane that is parallel to and midway between the top and bottom working surfaces 140 and 142. The central axis 182 of the piston bore 178 intersects the main bearing journal axis 66 of the first crankshaft 52 at a right angle.

A second cylindrical piston bore 186 having an end surface 188 is defined in the body 110 of the first piston assembly 56. The second piston bore 186, having a central axis 190, extends inward from the first semicylindrical end surface 130 of the second end portion 118. The axes 182 and 190 of the piston bores 178 and 186 are coaxial. The central axis 190 of the second cylindrical piston bore 186 intersects the main bearing journal axis 88 of the second crankshaft 54 at a right angle.

The second piston assembly 58 is sealingly engaged in the first cylindrical piston bore 178 and pivotally connected directly to the crankpin 68 of the first crankshaft 52. The third piston assembly 60 is sealingly engaged in the second cylindrical piston bore 186 and pivotally connected directly to the crankpin 90 of the second crankshaft 54 and in opposed relationship with the second piston assembly 58.

As shown in FIGS. 2–4 the second and third piston assemblies 58 and 60 are identical and includes a body portion 198, a bearing cap 200, a pair of semicylindrical bearing shells 202 and 204 and a pair of fasteners or bolts 206 to removably secure the cap to the body portion 198. The body portion 198 includes a generally cylindrical head end 208 having a working surface 210 facing the respective end surfaces 180 and 188 of the bores 178 and 186 and a coupling end 212. The head end 208, as best shown in FIG. 2 defines a pair of sealing ring grooves 216 which are adapted to receive a pair of sealing rings 218 in the usual manner. The coupling end 212 defines a semicylindrical surface 220 for mounting the bearing shell 202 and the bearing cap 200 defines a semicylindrical surface 222 for mounting the bearing shell 204. Means 224 for pivotally connecting the respective second and third piston assemblies 58 and 60 directly to the crankpins 68 and 90 of the first and second crankshafts 52 and 54 includes the coupling end 212, the bearing cap 200, the bearing shells 202 and 204, and the bolts 206.

Referring to FIGS. 2, 3, and 7 a centrally located combustion space or chamber 254 is defined in the body 110 of first piston assembly 56 between the opposed working surfaces 210 of the second and third piston assemblies 58 and 60. The combustion space 254, being of variable volume, is defined by a horizontal top surface 256, a horizontal bottom surface 258, a pair of concave side surfaces 260 and 262 of the piston body 110, and the opposed working surfaces 212 of the piston assemblies 58 and 60.

FLOW CONTROL MEANS

The engine 10 further includes flow control means 266 as illustrated in FIGS. 1, 2, 5 and 6 for selectively communicating the induction passage passages 282 and 286 with the intake chamber 144, the intake chamber 144 with the combustion space 254, the combustion space 254 with the exhaust chamber 146, and the exhaust chamber 146 with the scavenge passages 414 and 422. The flow control means 266 include induction means 268, intake means 270, exhaust means 272, and scavenge means 274.

As shown in FIGS. 1, 2, and 5 the upper portion 12 of the housing 10 further includes a left induction air manifold 280 defining a left air induction passage 282 and a right induction air manifold 284 defining a right air induction passage 286. The ceiling surface 32 of the first portion 12 of the housing 10 defined a plurality of induction ports 288. In this specific instance there are eight induction ports 288, four of which connects the left induction passage 282 with the intake chamber 144 and four of which that connects the right induction passage 286 with the intake chamber. An annular induction valve seating surface 290 is defined about each one of the induction ports 288.

The induction means 268 operatively communicates the induction passages 282 and 286 with the intake chamber 144 via the induction passages 282 and 286 and the induction ports 288. The induction means 268 include a self opening induction poppet valve assembly 294 operatively disposed in each one of the induction port 288. Each one of the induction valve assemblies 294 includes an induction valve 296 and an induction valve spring 298. The induction valve 296 includes an induction valve stem 300, an induction head portion 302 disposed at one end of the induction valve stem and an enlarged end portion 303 disposed at an opposite end of the induction valve stem. The induction valve head portion 302 defines an annular induction valve sealing face 304 being of a dimension sufficient for sealingly seating of the induction valve 296 on the induction valve seating surface 290. The induction valve spring 298 urges the induction valve 296 against the induction valve seating surface 290 until the induction valve head portion 302 is moved from the induction valve seating surface. The induction valve spring 298 is located between the enlarged end 303 of the induction valve 296 and an induction valve guide web 305 in each of the induction ports 288 and is operative to urge the induction valve 296 against the respective induction valve seating surface 290. Although simple self opening poppet induction valve assemblies are shown it is recognized that other induction valve arrangements are possible with actuation, for example, by mechanical, electrical, or other means.

As best shown in FIGS. 2, 6, 7, and 8 the piston body 110 defines a pair of first and second profiled intake ports 306 and 308 that are longitudinally aligned between the side surfaces 112 and 114 of the body. The intake ports 306 and 308 extends between the top working surface 140 and the top surface 256 of the combustion space 254 and have a central axes 310 and 312 respectively. The central axes 310 and 312 are generally perpendicular to the top working surface 140 and approximately midway between the semicircular end surfaces 120 and 130 of the body 110. As best shown in FIG. 7 an annular seating surface 314 is defined in the top surface 256 of the combustion space 254 about each one of the intake ports 306 and 308.

The intake means 270 operatively communicates the intake chamber 144 with the combustion space 254 via the first and second ports 306 and 308. The intake means 270, in this specific instance, includes an intake poppet valve assembly 316 of the self opening type, operatively mounted in each one of the intake ports 306 and 308 of the piston body 110. The intake poppet valve assembly 316 includes an intake valve 320 and a spring 322. The intake valve 320 includes a intake valve stem 324 and an intake valve head portion 326 disposed at the end of the intake valve stem. The intake valve head portion 326 defines an annular intake valve sealing face 328 of a dimension sufficient for sealing seating of the intake valve sealing face on the intake valve seating surface 314. The intake valve spring 322 urges the intake valve 320 against the intake valve seating surface 314 until the intake valve head portion 326 is moved from the intake valve seating surface. The intake valve spring 322 is located between an enlarged end 330 of the intake valve stem 342 and an intake valve guide web 332 in each of the intake ports 306 and 308 and is operative to urge the intake valve 320 against the respective intake valve seating surface 314. Although simple self opening poppet intake valve assemblies 316 are shown it is recognized that other intake valve arrangements are possible with actuation, for example, by mechanical, electrical, or other means.

Figure 6:
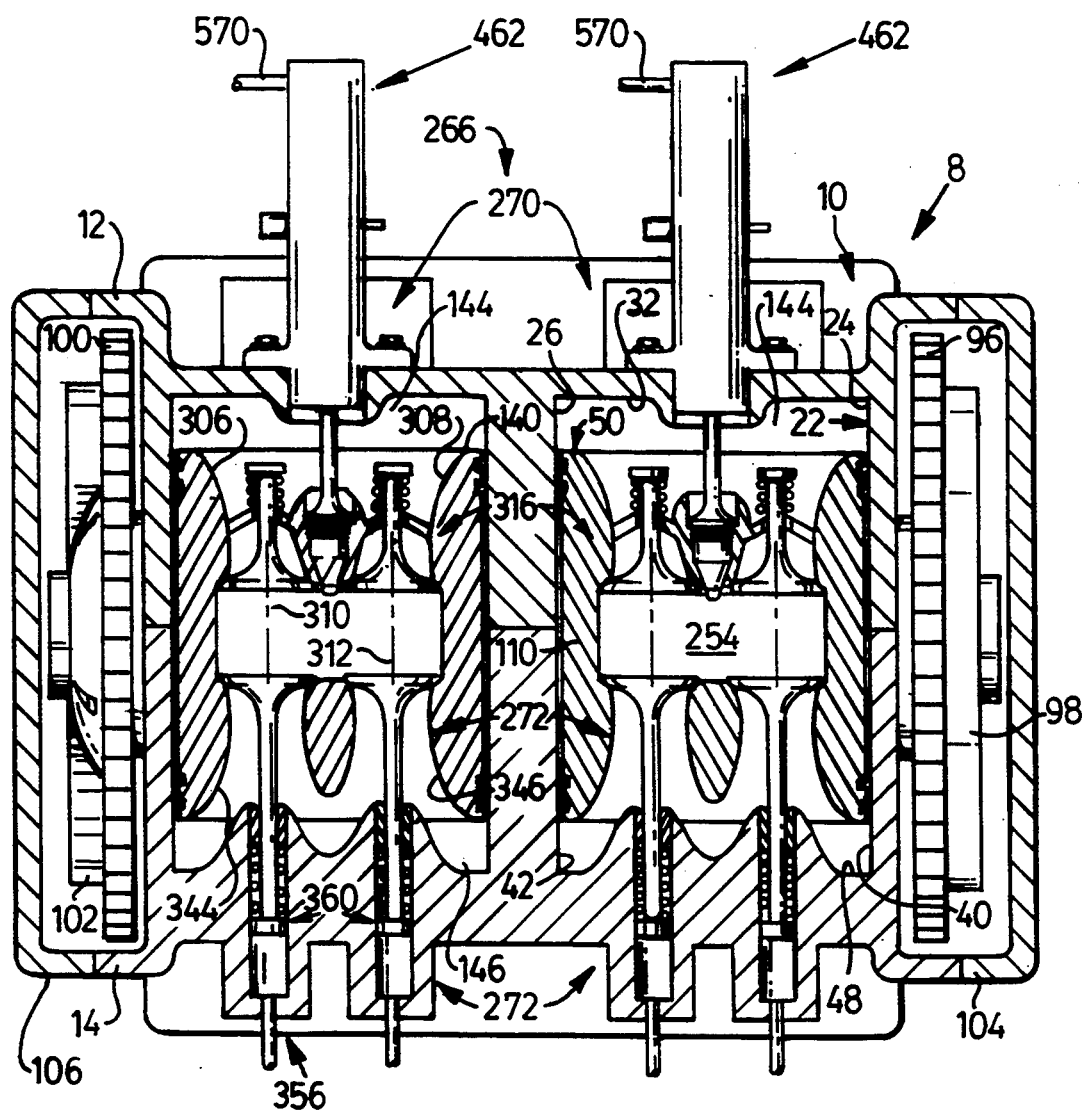
FIG. 6 is a diagrammatic transverse cross-sectional view of the engine constructed in accordance with the present invention taken in the direction of arrows 6—6 in FIG. 2.

As shown in FIGS. 2, 6 and 7 the piston body 110 further defines a pair of first and second profiled exhaust ports 344 and 346 having a central axis 348 and 350 respectively. The exhaust ports 344 and 346 are longitudinally aligned between the side wall 112 and 114 of the body 110 and extend between the bottom working surface 142 and the bottom surface 258 of the combustion space 254. The central axes 348 and 350 of the exhaust ports 344 and 346 are generally perpendicular to the bottom working surface 142 and approximately midway between the semicircular end surfaces 122 and 132 of the piston body 110. The central axis 348 of first exhaust port 344 is axially aligned with the central axis 310 of first intake port 306 and the central axis 350 of the second exhaust port 344 is axially aligned with the central axis 312 of second intake port 308. An annular exhaust valve seating surface 352 is defined in the bottom surface 258 of the combustion space 254 and about each one the exhaust ports 344 and 346.

The exhaust means 272 selectively communicates the combustion space 254 with the exhaust chamber 146 via the first and second exhaust ports 344 and 346. The exhaust means 272 includes an exhaust valve operating mechanism 356. The exhaust valve operating mechanism 356 includes an exhaust valve 358 operatively mounted in each one of the exhaust ports 344 and 346 and an exhaust valve support means 360 for reciprocally supporting the exhaust valves 358 on the housing 10 for movement with the low pressure piston assembly 56. The exhaust valves 358 each include an exhaust valve stem 366 and an exhaust valve head portion 368 disposed at the end of the exhaust valve stem. The exhaust valve head portion 368 defines an annular exhaust valve sealing face 370 of a dimension sufficient for sealingly seating elf the exhaust valve sealing face on the exhaust valve seating surface 352 of the piston body 110. The exhaust valve support means 360 includes an exhaust valve sleeve bearing or exhaust valve guide 376 mounted in an exhaust valve pump cylinder 378 defined in the bottom surface 48 of the lower portion 14 of the housing 10 and a cylindrical exhaust valve pump piston 380 mounted on an end of the exhaust valve 358 opposite the exhaust valve head portion 368. The exhaust valve guide 376 encompasses the exhaust valve stem 366 and the exhaust valve pump piston 380 is adapted for reciprocal sliding movement in the exhaust valve pump cylinder 378. An outer exhaust valve pump chamber 382 is defined in the exhaust valve pump cylinder 378 outwardly of the exhaust valve pump piston 380. An inner exhaust valve spring chamber 384 is defined in the exhaust valve pump cylinder 378 inwardly of the exhaust valve pump piston 380. An exhaust valve spring 386 is disposed about the exhaust valve stem 366 in the exhaust valve spring chamber 384 and extends between the exhaust valve guide 376 and the exhaust valve pump piston 380. The exhaust valve actuating spring 386 urges the exhaust valve sealing face 370 of the exhaust valve 358 against the exhaust valve seating surface 352 until the exhaust valve head portion 368 is moved away from exhaust valve seating surface.

As best shown in FIGS. 1, 2, and 5 the lower portion 14 of the housing 10 defines a pair of left profiled scavenge ports 410 that connect the exhaust chamber 146 with a first scavenge passage 414 in a left scavenge manifold 416. An annular first scavenge valve seating surface 418 is defined about each of the left scavenge ports 410. The lower portion 14 of the housing 10 further defines a pair of right scavenge ports 420 that connects the exhaust chamber 146 with a second scavenge passage 422 defined in a right scavenge manifold 424. An annular second scavenge valve surface 426 is defined about each of the right scavenge ports 420.

The scavenge means 274 selectively and operatively communicates the exhaust chamber 146 with the left and right scavenge manifolds 416 and 424 via the two pair of scavenge ports 410 and 420 and the first and second scavenge passages 414 and 422. The scavenge means 274 includes a scavenge valve operating mechanism 428. The scavenge valve operating mechanism 428 includes a scavenge valve 430 associated with each one of the scavenge ports 410 and 420 and scavenge valve support means 432 for reciprocally supporting the scavenge valves on the housing 10. The scavenge valve 430 includes a scavenge valve stem 434 and a scavenge valve head portion 436 disposed at the end of the scavenge valve stem. The scavenge valve head portion 436 defines an annular scavenge valve sealing face 438 of a dimension sufficient for sealingly seating of the scavenge valve sealing face on the respective scavenge valve seating surfaces 418 and 426. The scavenge valve support means 432 includes a scavenge valve sleeve bearing or scavenge valve guide 444 mounted in a scavenge valve pump cylinder 446 defined in the housing 10 and a cylindrical scavenge valve pump piston 448 mounted on an end of the scavenge valve stem 434 opposite the scavenge valve head portion 436. The scavenge valve guide 444 encompasses the scavenge valve stem 434 and the scavenge valve pump piston 448 is adapted for reciprocal sliding movement in the scavenge valve pump cylinder 446. An scavenge valve pump chamber 450 is defined in the scavenge valve pump cylinder 446 outwardly of the scavenge valve pump piston 448. An scavenge valve spring chamber 452 is defined in the scavenge valve pump cylinder 446 inwardly of the scavenge valve pump piston 448. A scavenge valve coil spring 454 is disposed about the scavenge valve stem 434 in the scavenge valve spring chamber 452 and extends between the scavenge valve guide 444 and the scavenge valve pump piston 448. The scavenge valve spring 454 urges the scavenge valve seating face 438 of the scavenge valve 430 against the respective scavenge seating surfaces 418 and 426 until the scavenge valve head portion 436 is moved away from the scavenge valve seating surface.

FUEL INTRODUCING SYSTEM

Referring to FIGS. 7 and 8 of the drawings of a fuel introducing system 455 is shown. The fuel introducing system 455 includes a fuel injector nozzle assembly 456 mounted on the first piston assembly 56 and communicates with the combustion space 254 and fuel injection means 458 including communication means 463 connected for movement with the first piston assembly 56 for controllably delivering fuel to the fuel injector nozzle assembly 456 in response to reciprocation of the first piston assembly 56. The communication means 463 includes a control member 464 and the fuel injector means 458 includes a fuel pump assembly 460. The fuel pump assembly 460 includes a pump body 462 in which the plunger or control member 464 is reciprocably positioned. The pump body 462 is removably secured by a pair of fasteners or bolts 466 in a mounting bore 468 defined in the upper portion 12 of the housing 10. The mounting bore 468 has a central axis 470 that is preferably located on a first plane that is parallel to and midway between the side surfaces 24 and 26 of the operating chamber 22 and on a second plane that is parallel to and midway between the semicylindrical end surfaces 28 and 44.

The pump body 462 defines a fuel pump cylinder 474 having a central axis 475 that is coaxial with the axis 470 of the mounting bore 468. The control member 464 includes an outer rod portion 476 that extends through an outer rod bore 478 defined in the pump body 462, an intermediate fuel pump piston portion 480, and an inner rod portion 482 that extends through an inner rod bore 484 defined in the pump body. The cross-sectional areas of the outer and inner rod portions 476 and 482 within the fuel pump cylinder 474 are identical. The fuel pump piston portion 480 includes an outer control end surface 488, a cylindrical land surface 490 of a predetermined axial length, and a inner control end surface 492. An outer fuel pump chamber 494 is defined in the fuel pump cylinder 474 outwardly of the fuel pump piston portion 480 and an inner fuel pump chamber 498 is defined in the the fuel pump cylinder inwardly of the fuel pump piston portion. The outer fuel pump chamber 494 is supplied fuel from a source 500 via a fuel line 502 and a transverse passage 504 defined in the pump body 462. A fuel transfer passage 506 is defined in the pump body 462 interconnecting the outer and inner fuel pump chambers 494 and 498. A first fuel pump port 510 defined in the pump body 462 connects the transfer passage 506 to the fuel pump cylinder 474. A passage blocking piston 514 of a solenoid actuated valve 516 is located in the transfer passage 506 between the outer fuel pump chamber 494 and the connection of the first fuel pump port 510 and is operative to selectively block fluid flow therethrough. A fill passage 518 is defined in the pump body 462 connecting the transverse passage 504 with the fuel pump cylinder 474. A second fuel pump port 522 defined in the pump body 462 connects the fuel pump cylinder 474 to the fill passage 518. The second port 522 is spaced axially inwardly of the first fuel pump port 510.

A profiled nozzle bore 526, opening into the combustion space 254, is defined in the first piston assembly 56. The nozzle bore 526 has an axis co-axial with the central axis 470 of mounting bore 468. The injector nozzle assembly 456 is located in the nozzle bore 526 and operative to inject fuel into the combustion space 254. The nozzle assembly 456 includes a fuel injector body 530 defining a flow charge passage 532, an injector valve bore 534, and spray orifice means 536. An injector valve spring 538 biases an injector valve 540 that is reciprocally disposed in the injector valve bore 534.

The inner rod portion 482 of the control member 464 includes an enlarged end portion 544 threadably secured to the first piston assembly 56 to impart reciprocal movement of the fuel pump piston 480 in the fuel pump cylinder 474 with reciprocal movement of the first piston assembly 56. The end portion 544 includes a counterbore 546 that encompasses the injector body 530 of the injector nozzle assembly 456 capturing the injector nozzle assembly in the nozzle bore 526. The inner rod portion 482 further includes an axial supply passage 548 that connects the inner fuel pump chamber 498 of the fuel pump cylinder 474 to the flow charge passage 532 in the injector body 530.

EXHAUST VALVE ACTUATION

Referring to FIGS. 2, 6 and 7 and specifically FIG. 7, the exhaust means 272 further includes exhaust valve actuation means 560 for controllably displacing the exhaust valve sealing face 370 of each exhaust valve 358 away from its respective exhaust valve sealing surface 352 during a preselected range of movement of the first piston assembly 56 in the operating chamber 22. The exhaust valve actuation means 560 includes transfer means 562 for transferring hydraulic fluid between an exhaust valve transfer pump cylinder 564 defined in the pump body 462 and the exhaust valve pump chambers 382 associated with each of the exhaust valves 358. The transfer pump cylinder 564 has an axis that is coaxial with the axis 470 of the mounting bore 468 for the pump body 462. The outer rod portion 476 of the control member 464 extends into the exhaust valve transfer pump cylinder 564. A cylindrical transfer pump piston 566 is mounted on an end of the outer rod portion 476 for reciprocal movement therewith. A transfer pump chamber 568 is defined in the transfer pump cylinder 564 outwardly of the transfer pump piston 566. The cross-sectional area of the transfer pump chamber 568 is equal to the combined cross-section areas of the exhaust valve pump chambers 378 associated with each of the exhaust valves 358. A transfer conduit 570 interconnects the transfer pump chamber 568 with each of the exhaust valve pump chambers 382.

As shown in FIG. 7 the exhaust valve actuation means 560 further includes an exhaust valve actuator cylinder assembly 574. The exhaust valve actuator cylinder assembly 574 includes an exhaust valve actuator body 576 defining an exhaust valve actuator bore 578 with an exhaust valve actuator piston 580 slidably disposed in the exhaust valve actuator bore. An exhaust valve actuator fluid chamber 582 having a preselected volume is defined in the exhaust valve actuator bore 578 between the exhaust valve actuator piston 580 and one end of the exhaust valve actuator chamber. An exhaust valve actuator piston rod 584 is connected to the exhaust valve actuator piston 580 opposite the exhaust valve actuator chamber 582. An exhaust valve actuator cam follower 586 is connected at an end of the exhaust valve actuator rod 584 and rides on a exhaust valve cam 588 driven by the engine 8. The exhaust valve cam 588 makes one revolution for each revolution of the first and second crankshafts 52 and 54. An exhaust valve actuator spring 590 is disposed in the exhaust valve actuator chamber 582 between the exhaust valve actuator piston 580 and an end of the exhaust valve actuator chamber biases the exhaust valve cam follower 586 against the exhaust valve cam 588. The exhaust valve actuator chamber 582 is connected to the transfer conduit 570 by a branch conduit 592.

SCAVENGE VALVE ACTUATION

Referring to FIGS. 2 and 5 the scavenge means 274 further includes scavenge valve actuation means 594 for controllably displacing the scavenge valve sealing face 438 of each scavenge valve 430 away from its respective scavenge valve seating surfaces 418 and 426 at a preselected time. The scavenge valve actuation means 594 includes a scavenge valve actuator assembly 596. The scavenge valve actuator assembly 596 includes a scavenge valve actuator body 598 defining a scavenge valve cylindrical actuator bore 600, with an scavenge valve actuator piston 602 slidably disposed in the scavenge valve actuator bore. A scavenge valve actuator fluid chamber 604 having a preselected volume is defined in the scavenge valve actuator bore 602 between the scavenge valve actuator piston 602 and one end of the scavenge valve actuator chamber. A scavenge valve actuator piston rod 606 is connected to the scavenge valve actuator piston 602 opposite the scavenge valve actuator chamber 604. A scavenge valve actuator cam follower 608 is connected to an end of the scavenge valve actuator piston rod 606 and rides on a scavenge valve cam 610 driven by the engine 8. The scavenge valve cam 610 makes one revolution for each revolution of the first and second crankshafts 52 and 54. A scavenge valve actuator spring 612 disposed in the scavenge valve actuator chamber 604 between the scavenge valve actuator piston 602 and an end of the scavenge valve actuator chamber biases the scavenge valve actuator cam follower 608 against the scavenge valve cam 610. A conduit 614 connects the scavenge valve actuator chamber 604 with each of the scavenge valve pump chambers 450 associated with each of the scavenge valves 430.

Industrial Applicability

In operation the pair of opposed high pressure piston assemblies 58 and 60 of the dual compression and dual expansion internal combustion engine 8, are directly mounted on the respective pair of crankpins 68 and 90 of the geared together, counter rotating, crankshafts 52 and 54. The high pressure piston assemblies 58 and 60 are reciprocally and sealably disposed in their respective bores 178 and 186 of the low pressure piston assembly 56 and driven by combustion in the combustion space 254 transferring energy to the crankshafts 52 and 54. The orbital movement of the high pressure piston assemblies 58 and 60 and the pressure caused by the expanding exhaust gas in the exhaust chamber 146 acting on the bottom working surface 142 of the low pressure piston assembly 56 reciprocally drives the low pressure piston assembly in the operating chamber 22. Other operating chambers 22, with multiple-piston subassemblies 50 can be added along the crankshafts 52 and 54 by adding additional crankpins 68 and 90, flow control means 226, and fuel introducing systems 455 in the manner of the additional cylinders of an in-line conventional engine. Alternatively, the multi-piston subassembly 50 may have only one crankshaft 52 and one high pressure piston assembly 58 directly mounted on the crankshaft 52 and disposed in one cylindrical piston assembly bore 178 defined in the body 110 of the low pressure piston assembly 56. As in the preceding arrangement, other operating chambers 22, with alternative multi-piston subassemblies 50 can be added along the crankshaft 52 by adding additional crankpins 68, flow control means 226, and fuel introducing systems 455.

There are three varying volume chambers within each operating chamber 22. The disposition of the top surface 140 of the low pressure piston assembly 56 within the first cavity 18 defines the intake chamber 144 of varying volume. The disposition of the second and third piston assemblies 58 and 60 within their respective bores 178 and 186 of the low pressure piston assembly 56 defines the variable volume combustion chamber 254. The disposition of the bottom working surface 142 of the low pressure piston assembly 56 in the second cavity 20 defines the variable volume exhaust chamber 146. Air, fuel, and gas of combustion move from the intake chamber 144 to the exhaust chamber 146 through the intake means 270 and the exhaust means 272 in the low pressure piston assembly 56, but in the process the air and fuel are compressed and combusted and gas is expanded in the combustion space 254 between the high pressure piston assemblies 56 and 60.

Figure 9:
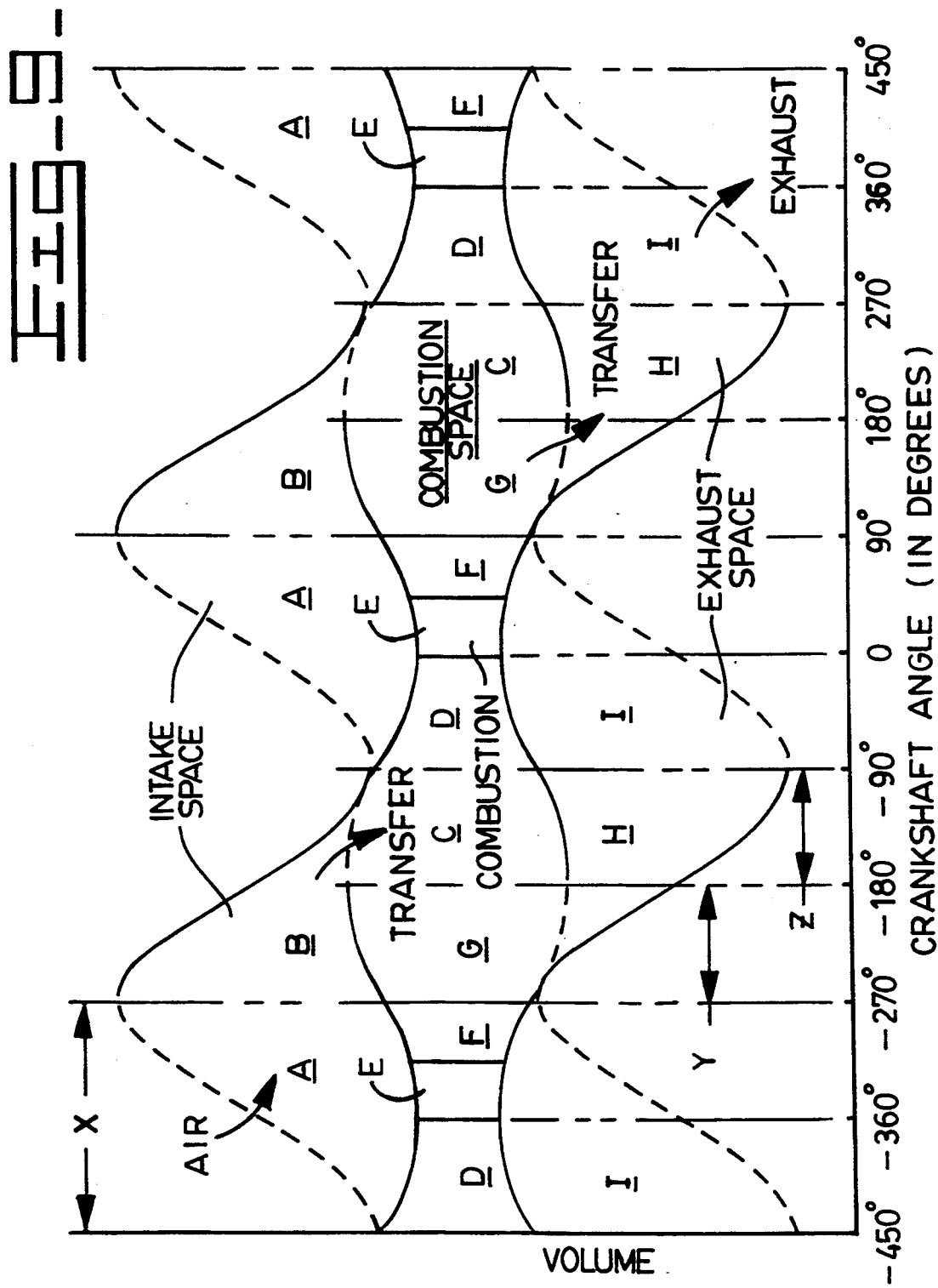
FIG. 9 is a graph illustrating the changing volumes in the intake chamber, the combustion chamber, and the exhaust chamber relative to crankshaft angle for each operating chamber and multi-piston subassembly.

The operating processes or steps of engine 8, identified as A through I, are timed as shown in FIG. 9. A complete cycle from start of air entry into the intake chamber 144 to the exit of the exhaust gas of the same charge from the exhaust chamber 146 takes approximately 900 degrees of rotation of the crankshafts 52 and 54 during which the intake chamber 144, the combustion chamber 254, and the exhaust chamber 146 each undergoes five "strokes".

Referring to FIGS. 1-3 and 9, step A begins at approximately −450 degrees of rotation of the crankshafts 52 and 54 and ends at approximately −270 degrees for a duration of approximately 180 degrees. During step A the low pressure piston assembly 56 is moved in the first direction in the operating chamber 22, away from the ceiling 32 of the intake chamber 144 increasing the volume of the intake chamber and inducting a charge of air through the induction passages 282 and 286 of the left and right induction manifolds 280 and 284, and the self opening induction poppet valve assemblies 29 disposed in each of the induction ports 288. Movement of the low pressure piston assembly 56 in the intake chamber 144 lowers the pressure in the intake chamber below the pressure in the the left and right induction passages 282 and 286. The higher pressure in the induction passages 282 and 286 acts on the induction valve head portions 302 within the intake chamber 144 overcoming the bias of the induction valve springs 298 moving the induction valve sealing faces 304 away from the induction valve seating surfaces 290. The intake valves 320 of the poppet intake valve assembly 316 disposed in the first and second intake ports 306 and 308 of the low pressure piston assembly 56 are maintained in the closed position by high pressure in the combustion chamber 254. The high pressure is created by sequential compression of air, combustion, and expansion of burning gas from steps D, E, and F of another one of the plurality of cycles occurring during the same time interval. The high pressure acts on the ends of the intake valve head portions 326 within the combustion chamber 254 forcing the intake valve sealing face 328 against the intake valve sealing surface 314.

Step B begins at approximately −270 of crankshafts 52 and 54 rotation and ends at approximately −180 degrees for a duration of approximately 90 degrees. During step B the low pressure piston assembly 56 is moved in the second direction towards the ceiling 32 of the intake chamber 144 compressing the charge of inducted air in the intake chamber. The induction valves 296 of the induction valve assemblies 294 are maintained sealingly seated against the induction valve seating surfaces 314 by the pressure created by the air being compressed within the intake chamber 144 acting on the ends of the induction valve head portions 302 within the intake chamber 144. During this interval the pressure within the combustion space 254 is greater than the pressure created by the compression of the air in the intake chamber 144 and the poppet intake valves 316 are maintained in the closed position. The pressure in the combustion chamber 254 is caused by the expansion of burning gas in the combustion chamber 254 from step G of another one of the plurality of cycles occurring during the same time interval. The high pressure acts on the ends of the intake valve head portions 326 of the intake valves 320 within the combustion chamber 254 forcing the intake valve sealing face 328 against the intake valve sealing surface 314.

Step C begins at approximately −180 degrees of rotation of the crankshafts 52 and 54 and ends at approximately −90 degrees for a duration of approximately 90 degrees. During step C, the low pressure piston assembly 56 is moved further in the second direction, continuing to compress the charge of induction air in the intake chamber 144 while transferring the charge of compressed air to the combustion space. During this interval the pressure of compression in the intake chamber 144 is greater than the pressure in the combustion chamber 254 and the bias of the intake valve springs 322 and the intake valves 320 are forced away from the intake valve seating surfaces 314 by the pressure of compression acting of the surfaces of the intake valve head portions 326 adjacent the intake valve stems 324. During the same interval, the second and third piston assemblies 58 and 60 are moved in their respective bores 178 and 186 compressing the charge of compressed air in the combustion space 254. The exhaust valves 358 are closed and the exhaust valve sealing faces 370 are maintained against their respective seating surfaces 352 by the bias of the exhaust valve springs 386 and the rising pressure of compression in the combustion space 254 acting on the ends of the exhaust valve head portions 368 within the combustion space 254.

Step D begins at approximately −90 degrees of rotation of the crankshafts 52 and 54 and ends at approximately 0 degrees for a duration of approximately 90 degrees. During step D the second and third piston assemblies are moved further in their respective bores 178 and 186 compressing the charge of compressed air in the combustion space 254. During this interval, the intake valves 320 and the exhaust valves 358 are closed by the pressure of compression in the combustion space 254 being greater than the pressure in intake chamber 144 and the pressure in the exhaust chamber 146. The pressure of compression acts on the ends of intake valve head portions 326 and the exhaust valve head portions 368 within the combustion chamber 254 maintaining the intake valve sealing faces 328 and the exhaust valve sealing faces 370 against their respective intake valve seating surface 314 and exhaust valve seating surface 352.

Step E beings at approximately 0 degrees of rotation of the crankshafts 52 and 54 and ends at approximately 50 degrees for a duration of approximately 50 degrees. During step E, fuel is introduced into the combustion space 254 at approximately the beginning of the time interval to form a mixture of fuel and air which auto ignites forming expanding exhaust gas driving the high pressure piston assemblies 58 and 60 apart transmitting energy to the crankshafts 52 and 54. During this interval the pressure in the combustion chamber 254 caused by combustion is greater than the pressure in the intake chamber 144 and the exhaust chamber 146. The pressure of combustion acts on the ends of intake valve head portions 326 and the exhaust valve head portions 368 within the combustion chamber 254 maintaining the intake valve sealing faces 328 and the exhaust valve sealing faces 370 against their respective intake valve seating surface 314 and exhaust valve seating surface 352.

Step F begins at approximately 50 degrees of rotation of the crankshafts 52 and 54 and ends at approximately 90 degrees for a duration of approximately 40 degrees. During step F the high pressure piston assemblies 58 and 60 continue to be driven apart in their respective bores 178 and 186 by the pressure of the expanding exhaust gas, transmitting energy to the crankshafts 52 and 54. During this interval the pressure in the combustion chamber 254 is greater than the pressure in the intake chamber 144 and the exhaust chamber 146. The pressure caused by the expanding exhaust gas acts on the ends of intake valve head portions 326 and the exhaust valve head portions 368 within the combustion chamber 254, maintaining the intake valve sealing faces 328 and the exhaust valve sealing faces 370 against their respective intake valve seating surfaces 314 and exhaust valve seating surfaces 352.

Step G begins at approximately 90 degrees of rotation of the crankshafts 52 and 54 and ends at approximately 180 degrees for a duration of approximately 90 degrees. During step G the high pressure piston assemblies 58 and 60 continue to be driven apart in their respective bores 178 and 186 by the pressure of the expanding exhaust gas transmitting energy to the crankshafts 52 and 54 while at the same time the expanding exhaust gas is being transferred to the exhaust chamber 146. During this interval the low pressure piston assembly 56 is being moved in the second direction increasing the volume of the exhaust chamber 146 while compressing inducted air in the intake chamber 144 from step B of yet another one of the plurality of cycles. The pressure of the expanding gas in the combustion chamber 254 is greater than the pressure caused by compression of the inducted air in the intake chamber 144. The pressure of the expanding gas in the combustion chamber 254 acts on the ends of intake valve head portions 326 within the combustion chamber, maintaining the intake valve sealing faces 328 against the intake valve seating surfaces 314. The exhaust valve actuation means 560 controllably displaces the exhaust valve sealing faces 370, of the exhaust valves 358, away from their respective exhaust valve seating surfaces 352 allowing the transfer of the expanding exhaust gas to the exhaust chamber 146. The scavenge valves 430 are closed during step G, and the scavenge valve sealing surfaces 438 are maintained against their respective scavenge valve seating surfaces 418 and 426 by the pressure of the expanding exhaust gas in the exhaust chamber 146.

Step H begins at approximately 180 degrees of rotation of the crankshafts 52 and 54 and ends at approximately 270 degrees, for a duration of approximately 90 degrees. During step H the high pressure piston assemblies 58 and 60 are moved in their respective bores 178 and 186, compressing air in the compression chamber 254 from step C of the yet another one of the plurality of cycles occurring during the same interval. The exhaust valves 358 are closed and the exhaust valve sealing faces 370 are maintained against their respective seating surfaces 352 by the bias of the exhaust valve springs 386 and the rising pressure of compression in the combustion space 254 acting on the ends of the exhaust valve head portions 368 within the combustion space 254. The scavenge valves 430 are closed, and the scavenge valve sealing surfaces 438 are maintained against their respective scavenge valve seating surfaces 418 and 426 by the pressure of the expanding exhaust gas in the exhaust chamber 146. The pressure caused by the expansion of the exhaust gas in the exhaust chamber 146, assists in driving the the low pressure piston assembly 56 in the second direction. Expansion of the exhaust gas is controllably achieved in the exhaust chamber 146 in a manner to reduce the exhaust pressure to be essentially near or at scavenge passages 414 and 422 pressure at the end of the step H.

Step I begins at approximately 270 degrees of rotation of the crankshafts 52 and 54 and ends at approximately 450 degrees for a duration of approximately 180 degrees. During step I the exhaust valves 358 are maintained in a closed position by high pressure in the combustion chamber 254. The high pressure is created by sequential compression of air, combustion, and expansion of burning gas from steps D, E, and F of the yet another one of the plurality of cycles occurring during the same interval. The high pressure acts on the ends of the intake valve head portions 326 within the combustion chamber 254, forcing the intake valve sealing face 328 against the intake valve sealing surface 314. The scavenge valve actuation means 594 controllably displaces the scavenge valve sealing face 438 of each scavenge valve 430 away form its respective scavenge valve seating surface 418 and 426, allowing the scavenge of the exhaust gas from the exhaust chamber 146 by way of the first and second scavenge passages 414 and 422. During this interval the low pressure piston assembly 56 is being moved in the first direction reducing the volume of the exhaust chamber 146 and scavenging the exhaust chamber.

Each individual chamber 144, 254, and 146 of the engine 8, sees its cycle repeated every crankshaft revolution, so in that respect the engine is more like a two-stroke engine. FIGS. 10a through 10f schematically illustrates relative positions of the multi-piston subassembly 50 and the flow control means 266 within the operating chamber 22, at specific locations during one complete rotation of the crankshafts 52 and 54. The first 180 degrees of the crankshafts 52 and 54 rotation are identified as period or step X in FIG. 9. FIG. 10a schematically illustrates approximately the −450 degree position of the crankshafts 52 and 54 or the start of the step X as indicated in FIG. 9. FIG. 10b schematically illustrates approximately the −360 degree position of crankshafts 52 and 54. FIG. 10c schematically illustrates approximately the −270 degree position of crankshafts 52 and 54. During the time interval of step X, the low pressure piston assembly 56 is moved in the first direction in the operating chamber 22 increasing the volume of the intake chamber 144, inducting a charge of air into the intake chamber 144 and reducing the volume in the exhaust chamber 146, exhausting a charge of exhaust gas from the exhaust chamber 146. During the same interval the high piston assemblies 58 and 60 are moved in the bores 178 and 186 compressing another charge of air in the combustion space 254. As illustrated in FIG. 10b, at approximately −360 degrees of crankshafts 52 and 54 rotation, fuel is introduced into the combustion space 254 forming a combustible mixture of fuel and air which auto ignites forming expanding exhaust gas driving the high pressure piston assemblies 58 and 60 in their respective bores 178 and 186 and transmitting the energy to the crankshafts 52 and 54.

The next 90 degrees of the crankshafts 52 and 54 rotation is identified as a period or step Y in FIG. 9. FIG. 10d schematically illustrates approximately the −225 degree position of the crankshafts 52 and 54. During the time interval of step Y, the low pressure piston assembly 56 is moved in the second direction compressing the charge of air in the intake chamber 144. During the same time interval the high pressure piston assemblies 58 and 60 continue to be driven in their respective bores 178 and 186 transmitting energy to the crankshafts 52 and 54 while transferring the expanding exhaust gas to the exhaust chamber 146.

The next 90 degrees of rotation of the crankshafts 52 and 54 is identified as a period or step Z in FIG. 9. FIG. 10e schematically illustrates approximately the −180 degree position of the crankshafts 52 and 54 or start of the step Z. FIG. 10f schematically illustrates approximately the −135 degree position of crankshafts 52 and 54. During step Z the low pressure piston assembly 56 continues to be driven in the second direction compressing the charge of air in the intake chamber 144 while transferring the charge of compressed air into the combustion space 254. During the same interval, the high pressure piston assemblies 58 and 60 are moved in their respective bores 178 and 186 further compressing the charge of compressed air in the combustion space 254. The pressure caused by the expansion of the exhaust gas in the exhaust chamber assists in driving the low pressure piston assembly 56 in the second direction transmitting energy to the crankshafts 52 and 54.

The exhaust valve actuation means 560 controllably displaces the exhaust valve sealing face 370 of each exhaust valve 358 away from its respective exhaust valve sealing surface 352 during each revolution of the crankshafts 52 and 54 and at a preselected range of movement of the low pressure piston assembly 56 in the operating chamber 22. The exhaust valves 358 are maintained against their respective exhaust valve seating surface 352 by the bias of exhaust valve springs 386 and the pressure of compression of air, combustion and expansion of exhaust gas in the combustion space 254. During reciprocal movement of the low pressure piston assembly 56 in the first direction, hydraulic fluid is pumped from the outer exhaust valve pump chambers 382 by the exhaust valve pistons 380 and transferred to the exhaust valve transfer pump chamber 568 by the exhaust valve transfer conduit 570. During reciprocal movement of the low pressure piston assembly 56 in the second direction, hydraulic fluid is pumped from the exhaust valve transfer pump chamber 568 by the transfer pump piston 566, which is attached to the low pressure piston by control member 464, and transferred to the outer exhaust valve pump chambers 382. Since the cross-sectional area of the exhaust valve transfer pump chamber 568 is equal to the combined cross-section areas of the exhaust valve pump chambers 378 associated with each of the exhaust valves 358 the result is merely the exchange of hydraulic fluid between the exhaust valve transfer pump chamber 568 and exhaust valve pump chambers 378.

The exhaust valves 358 are timed, as shown in FIG. 9, to be displaced from their respective exhaust valve seating surfaces 352 at the beginning of step H for a duration of approximately 90 degrees of crankshafts 52 and 54 rotation. During this interval, hydraulic fluid is pumped from the exhaust valve fluid actuator chamber 582 by the exhaust valve actuator piston 580 of the exhaust valve actuator cylinder assembly 574, to the outer exhaust valve pump chambers 382 by way of the branch conduit 592 and the exhaust valve transfer conduit 570. The exhaust valve actuator piston 580 is displaced by the exhaust valve cam follower 582 which rides on the exhaust valve actuator cam 588 driven by the engine 8. The exhaust valve actuator cam 588 makes one revolution for each revolution of the crankshafts 52 and 54. The additional volume of hydraulic fluid contributed by the action of the exhaust valve actuator piston 580 increases the volume of hydraulic fluid in the outer exhaust valve pump chambers 382 and acts on the ends of exhaust valve pump pistons 380, overcoming the bias of the exhaust valve springs 386 and the pressure from the expanding exhaust gas in the combustion chamber 254 acting on the ends of the exhaust valve head portions 368 within the combustion chamber, displacing the exhaust valves 358 from their respective seating surfaces 352. The additional volume of hydraulic fluid from the exhaust valve fluid actuator chamber 582 is forced to be transmitted to the outer exhaust valve pump chambers 382 since, the volume of the exhaust valve transfer pump chamber 568 cannot be increased. At this time, the volume of the exhaust valve transfer pump chamber 568 is being controllably reduced and the volume of the outer exhaust valve pump chambers 382 can be increased merely by displacing the exhaust valves 358 from their respective exhaust valve seating surfaces 352. This is accomplished by overcoming the bias of the exhaust, valve springs 386 and the pressure from the expanding exhaust gas in the combustion chamber 254 acting on the ends of the exhaust valve head portions 368 within the combustion chamber 254.

The scavenge valve actuation means 594 controllably displaces the scavenge valve sealing face 438 of each scavenge valve 430 away from their respective scavenge valve seating surfaces 418 and 426 during each revolution of the crankshafts 52 and 54. The scavenge valves 430 are maintained against their respective scavenge valve seating surfaces 418 and 426 by the bias of scavenge valve springs 454 and the pressure of the expansion of exhaust gas in the exhaust chamber 146.

The Scavenge valves 430 are timed, as shown in FIG. 9, to be displaced from their respective scavenge valve seating surfaces 418 and 426 at the beginning of step I for a duration of approximately 180 degrees of crankshafts 52 and 54 rotation. During this interval, hydraulic fluid is pumped from the scavenge valve fluid actuator chamber 604 by the scavenge valve actuator piston 602 of the scavenge valve actuator cylinder assembly 596, to the outer scavenge valve pump chambers 450 by way of the conduit 614. The scavenge valve actuator piston 602 is displaced by the scavenge valve cam follower 608 which rides on the scavenge valve cam 610 driven by the engine 8. The scavenge valve cam 610 makes one revolution for each revolution of the crankshafts 52 and 54. The additional volume of hydraulic fluid contributed by the action of the scavenge valve actuator piston 602 increases the volume and pressure of the hydraulic fluid in the outer scavenge valve pump chambers 450. This increasing pressure acts on the ends of scavenge valve pump pistons 448, overcoming the bias of the scavenge valve springs 454 and the pressure from the expanding exhaust gas in the exhaust chamber 146 acting on the ends of the scavenge valve head portions 436 within the exhaust chamber, displacing the scavenge valves 430 from their respective seating surfaces 418 and 426.

The fuel introducing system 455 controllably injects fuel into the combustion space during each revolution of the crankshafts 52 and 54 and at approximately the beginning of step E as shown on FIG. 9. The fuel injector nozzle assembly 456 is mounted on the low pressure piston assembly 56 and communicates with the combustion space 254 as shown on FIGS. 7 and 8. The control member 464 is reciprocably positioned in the fuel pump cylinder 474 and connected for movement with the low pressure piston assembly 56, controllably delivering fuel under high pressure from the fuel pump assembly 460 to the fuel injector nozzle assembly 456 in response to reciprocation of the low pressure piston assembly 56 in the first direction.

As shown on FIG. 8, the inner fuel pump chamber 498 is filled with fuel from the source 500 via the fuel line 502, the transverse passage 504, the fuel transfer passage 506, the first port 510, the fill passage 518, and the second port 522 as the low pressure piston assembly 56 is moved in the second direction during step B as shown on FIG. 9.

As the low pressure piston assembly 56 is moved in the first direction during steps D and E, fuel is transferred from the inner fuel pump chamber 498 to the outer fuel pump chamber 494 by inward movement of the fuel pump piston portion 480 in the fuel pump cylinder 474. The fuel is transferred by way of the fuel transfer passage 506, the first fuel port 510, the second fuel port 522, the fill passage 518, and the transverse passage 504. Since the cross-sectional area of the fuel pump cylinder 474 in each of the inner fuel pump chamber 498 and outer fuel pump chamber 494 is the same and the cross-section area of the inner rod portion 482 and outer rod portion 476 the is the same, then the volume of fuel being transferred between the inner fuel pump chamber and the outer fuel pump chamber is equal.

During inward movement of the fuel pump piston portion 480 both transfer ports 510 and 522 are blocked by the cylindrical land surface 490 and the solenoid actuator valve 516 is energized, extending the blocking piston 514 into the fuel transfer passage 506 blocking the fuel transfer passage. For the period when both the transfer ports 510 and 522 and the transfer passage 506 are blocked, fuel transfer from the inner fuel pump chamber 498 is prevented and fuel compression occurs until either the fuel injector nozzle assembly assembly 456 opens or the solenoid actuated valve 516 is actuated to move the passage blocking piston 514 to its open position, unblocking the fuel transfer passage.

While the transfer ports 510 and 522 and the fuel transfer passage 506 are blocked the fuel is communicated under high pressure to the fuel injector nozzle assembly 456 by way of the axial fuel supply passage 548. The high pressure fuel acts on the injector valve 540 within the injector valve bore 534, overcoming the bias of the injector valve spring 538 moving the injector valve 540 away from the spray orifice means 536 and allowing the injection of fuel into the combustion chamber 254 through the spray orifice means in a conventional manner. To end injection, the solenoid valve 516 is actuated to move the passage blocking piston 514 out of the fuel transfer passage 506, unblocking the fuel transfer passage reducing the pressure in the fuel pump chamber 498 and allowing the fuel to be transferred to the outer fuel pump chamber 494.

The engine 8 is in complete balance with respect to forces and couples in the longitudinal, transverse, and perpendicular directions. This is achieved by having the rear first and third timing and balancing gears 74 and 96 in mesh with one another and the front second and fourth timing and balancing gears 80 and 100 in mesh with one another and having respective balance weights 78, 82, 98, and 102 positioned approximately 180 degrees away from their respective adjacent crankpins 68 and 90.

Separation of the combustion chamber 254 top surface 256, bottom surface 258, and concave side surfaces 260 and 262 from the housing 10 will reduced structure-born combustion noise.

The maximum volume of the exhaust chamber 146 exceeds that of the intake chamber 144, this serves to reduce exhaust gas pressure and temperature when the scavenge valves 430 opens. In this manner efficiency is increased and noise is reduced relative to more conventional engines for which induction and exhaust volumes are equal.

In summary, it can be appreciated that compared to more conventional engines of equal power, the dual compression, dual expansion engine 8 is less than half the volume, is more efficient because it can use higher compression ratios with a more compact combustion chamber, and it has lower $NO_x$ emissions because it achieves high levels of exhaust retention without a loss of power.

Other aspects, objects, and advantages can be obtained from a study of the drawings, the disclosure and appended claims.

I claim:

1. A method of introducing fuel into a combustion space (254) of an engine (8); the method comprising:
   forming the combustion space (254) in a piston assembly (56) reciprocally disposed in an operating chamber (22) defined in a housing (10) of the engine (8);
   mounting a fuel injector nozzle assembly (456) on the piston assembly (56) so that it communicates with the combustions space (254);
   mounting a fuel pump assembly (460) including a control member (464) having a fuel pump piston portion (480) on the housing (10);
   connecting the control member (464) to the piston assembly (56) for reciprocal movement therewith;
   supplying fuel to the pump assembly (460) mounted on the housing (10);
   pumping the fuel under pressure to the fuel nozzle assembly (456) responsive to reciprocal movement of the piston assembly (56) and the control member (464); and
   operating the fuel nozzle assembly (456) to selectively inject the fuel from the fuel pump assembly (460) into the combustion space (254).

2. The method of claim 1 wherein the step of mounting the fuel nozzle assembly (456) on the piston assembly (56) includes:
   forming a nozzle bore (526) in a body (110) of the piston assembly (56) extending from a working surface (140) of the body (110) into the combustion space (254);
   inserting the fuel injector nozzle assembly (456) into the nozzle bore (526);
   encompassing the fuel injector nozzle assembly (456) in a counterbore (546) defined in an end portion (544) of an inner rod portion (482) of the control member (464); and
   capturing the fuel nozzle assembly (456) in the nozzle bore (526).

3. The method of claim 2 wherein the step of mounting the fuel pump assembly (460) on the housing includes:
   forming a mounting bore (468) in the housing (10) that extends into the operating chamber (22);
   inserting a pump body (462) of the fuel pump assembly (460) in the mounting bore (468); and
   securing the pump body (462) to the housing (10).

4. The method of claim 3 wherein the step of connecting the control member (464) to the piston assembly (56) includes:
   securing the end portion (544) of the inner rod portion (482) to the body (110).

5. The method of claim 4 wherein the step of supplying fuel to the fuel pump assembly (460) includes:
   connecting a source (500) of fuel to the fuel pump assembly (460).

6. The method of claim 4 wherein the step of pumping the fuel under pressure to the fuel nozzle assembly (456) includes:
   forming a fuel pump chamber (498) in the pump body (462) at one end of a fuel pump piston portion (480) of the control member (464);
   reciprocating the fuel pump piston portion (480) in response to reciprocal movement of the piston assembly (56);
   filling the fuel pump chamber (498) with fuel from the source (500) when the fuel pump piston portion (480) moves in a first direction;
   displacing the fuel from the fuel pump chamber (498) when the fuel pump piston portion (480) moves in a second direction;
   controlling the timing of when the fuel is displaced to the fuel nozzle assembly (460) and the amount of fuel of fuel delivered to the fuel nozzle assembly (456);
   communicating the fuel pump chamber (498) with the fuel nozzle assembly (456).

7. The method of claim 4 wherein the step of filling the fuel pump chamber (498) includes:
   forming a transverse passage (504) in the pump body (462);
   connecting the transverse passage (504) with a fuel line (502) and another fuel pump chamber (494) defined in the fuel pump cylinder (474) outwardly of the fuel pump piston portion (480);
   connecting the fuel line (502) to a fuel source (500);

forming a fuel transfer passage (506) in the pump body (462);

connecting the fuel transfer passage (506) with the another fuel pump chamber (494) and the fuel pump chamber (498);

forming a first fuel port (510) in the pump body (462);

connecting the first fuel port (510) with the fuel transfer passage (506) and the fuel pump cylinder (474);

forming a fill passage (518) in the pump body (462);

connecting the fill passage (518) with the fuel transverse passage (504);

forming a second fuel port (522) in the pump body; and connecting the second fuel port (522) to the fill passage (518) and the fuel pump cylinder (474).

8. The method of claim 7 wherein the step of displacing the fuel from the fuel pump chamber (498) when the fuel pump piston portion (480) moves in a second direction includes:

transferring fuel from the fuel pump chamber (498) to the another fuel pump chamber (494) by way of the fuel transfer passage (506), the first fuel port (510), the second fuel port (522), the fill passage (518), and the transverse passage (504);

blocking the first fuel port (510) with a cylindrical land surface (490) of the fuel pump piston portion (480);

blocking the fuel transfer passage (506) with a blocking piston (514) of a solenoid actuator valve (516);

blocking the second fuel pump port (522) with the cylindrical land surface (490) of the fuel pump piston portion (480);

compressing the fuel in the fuel pump chamber (498);

communicating the fuel under high pressure to the fuel injector nozzle assembly (456); and actuating the solenoid (516) to move the passage blocking piston (514), thus unblocking the fuel transfer passage (506) and reducing the pressure in the fuel pump chamber.

9. A method of introducing fuel into a combustion space (254) of an engine (8); the method comprising:

forming a combustion space (254) in a piston assembly (56) reciprocally disposed in an operating chamber (22) defined in a housing (10) of the engine (8);

mounting a fuel injector nozzle assembly (456) on the piston assembly (56) for movement therewith and so that spray orifice means (536) thereof communicates with the combustion space (254);

mounting a fuel pump assembly (460) on the housing (10);

connecting a communication means (463) between the fuel pump assembly (460) and the fuel injector nozzle assembly (456) with at least a portion of the communication means (463) being moveable with respect to one of the fuel pump assembly (460) and the fuel injector nozzle assembly (456);

supplying fuel to the fuel pump assembly (460);

pumping the fuel under pressure to the fuel nozzle injector assembly (456); and operating the fuel injector nozzle assembly (456) to selectively inject the fuel from the fuel pump assembly (460) into the combustion space (254).

10. A fuel injection system (455) for injecting fuel into a combustion space (254) defined in a piston assembly (56) reciprocally disposed in an operating chamber (22) defined in a housing (10) of an engine (8):

a fuel injector nozzle assembly (456) mounted on the piston assembly (56) and extending into the combustion space (254); and fuel injector means (458) including a control member (464) connected for movement with the piston assembly (56) for controllably delivering fuel under pressure to the fuel injector nozzle assembly (456) in response to the reciprocation of the piston assembly (56).

11. The fuel injection system (455) of claim 10 wherein the piston assembly (56) includes a body (110) having a working surface (140) and the combustion space (254) is defined in the body (110).

12. The fuel injection system (455) of claim 11 wherein a nozzle bore (526) having a central axis (470) is defined in the body (110) of the piston assembly (56) extending from the working surface (140) and opening into the combustion space (254) and the fuel injector nozzle assembly (456) is operatively disposed in the nozzle bore (526) to selectively inject fuel into the combustion space (254).

13. The fuel injection system (455) of claim 12 wherein the fuel injector nozzle assembly (456) includes an injector body (530) defining a flow charge passage (532), an injector value bore (534), an injector valve (540) reciprocally disposed in the injector valve bore (534) and biased by a spring (538), and spray orifice means (536) in fluid communication with injector valve: bore (534) and the combustion space (254).

14. The fuel injection system (455) of claim 13 wherein the fuel injection means (458) including a fuel pump assembly (460), the fuel pump assembly (460) includes a pump body (462), a fuel pump cylinder (474) having a central axis (475) is defined in the pump body (462) and the control member (464) is reciprocally disposed in the fuel pump cylinder (474).

15. The fuel injection system (455) of claim 14 wherein the housing (10) defines a mounting bore (468) having a central axis (470) and the pump body (462) is removably secured in the mounting bore (468).

16. The fuel injection system (455) of claim 15 wherein the central axis (470) of the mounting bore (468) and the central axis (475) of the fuel pump cylinder (474) are coaxial.

17. The fuel injection system (455) of claim 16 wherein the control member (464) includes an outer rod portion (476) that extends through an outer rod bore (478) defined in the body (462), an intermediate fuel pump piston portion (480), and a inner rod portion (482) that extends through an inner rod bore (484) defined in the pump body (462), the cross-sectional areas of the inner and outer rod portions (482, 476) within the fuel pump cylinder (474) are identical, the intermediate fuel pump piston portion (480) includes an outer control end surface (488), a cylindrical land surface (490) of a predetermined axial length, and an inner control end surface (492), an outer fuel pump chamber (494) is defined in the fuel pump cylinder (474) outwardly of the intermediate pump piston portion (480) and an inner fuel pump chamber (498) is defined in the fuel pump cylinder (474) inwardly of the intermediate fuel pump piston portion (480).

18. The fuel injection system (455) of claim 17 wherein the outer fuel pump chamber (494) is supplied fuel from a source (500) via a fuel passage (502) and a transverse passage (504) defined in the pump body (462), a fuel transfer passage (506) is defined in the pump body (462) interconnecting the outer and inner fuel pump chambers (444, 498), a first fuel pump port (510) defined in the pump body (462) connects the transfer passage (506) to the fuel pump cylinder (474), a passage blocking piston (514) of a solenoid actuated valve (516) is located in the transfer passage (506) between the outer fuel pump chamber (494) and the connection of the first fuel pump port (510) and is operative to selectively block fluid flow therethrough, a fill passage (518) is defined in the pump body (462) connecting the transverse passage (504) with the fuel pump cylinder (474), and a second fuel pump port (522) defined in the pump body (462) spaced axially inwardly of the first fuel pump port (510) connects the fuel pump cylinder (474) to the fill passage (518).

19. The fuel injection system (455) of claim 18 wherein inner rod portion (482) of the control member (464) includes an enlarged end portion (544) threadably secured to the piston assembly (56), the end portion (544) includes a counterbore (546) that encompasses the injector body (530) of the injector nozzle assembly (456) capturing the injector nozzle assembly in the nozzle bore (526), the inner rod portion (482) further includes an axial supply passage (548) that connects the inner fuel pump chamber (498) of the fuel pump cylinder (474) to the flow charge passage (532) in the injector body (530).

* * * * *